(12) United States Patent
Hane et al.

(10) Patent No.: US 7,888,627 B2
(45) Date of Patent: Feb. 15, 2011

(54) OPTICAL ENCODER HAVING A STRAY-LIGHT REDUCTION ELEMENT FOR REDUCING STRAT-LIGHT

(75) Inventors: Jun Hane, Tokyo (JP); Iwao Komazaki, Saitama (JP)

(73) Assignee: Olympus Corporation, Tokyo (JP)

( * ) Notice: Subject to any disclaimer, the term of this patent is extended or adjusted under 35 U.S.C. 154(b) by 30 days.

(21) Appl. No.: 12/409,792

(22) Filed: Mar. 24, 2009

(65) Prior Publication Data
US 2009/0242742 A1  Oct. 1, 2009

(30) Foreign Application Priority Data
Mar. 28, 2008  (JP) .............................. 2008-086382

(51) Int. Cl.
*G01D 5/34* (2006.01)
(52) U.S. Cl. ................... 250/231.13; 341/13; 341/31
(58) Field of Classification Search ............ 250/231.13, 250/231.18; 341/13, 31
See application file for complete search history.

(56) References Cited

U.S. PATENT DOCUMENTS 7,285,769 B2 * 10/2007 Oka et al. .............. 250/231.13

FOREIGN PATENT DOCUMENTS

JP  2005-156549  6/2005

* cited by examiner

*Primary Examiner*—Seung C Sohn
(74) *Attorney, Agent, or Firm*—Scully, Scott, Murphy & Presser, P.C.

(57) ABSTRACT

An optical encoder includes a scale which is installed on one member of which, displacement is detected, and a detecting head which is installed on the other member which moves relatively with respect to the one member, and is disposed facing the scale. A predetermined optical pattern in a direction of relative movement is provided, and the detecting head includes a light emitting section which irradiates a predetermined light on the scale, a light detecting section which includes a light receiving surface which receives light through the optical pattern, which is irradiated on the scale from the light emitting section, and which detects light distribution formed on the light receiving surface, a first light transmitting member which is disposed in an optical path between the light emitting section and the scale, and a second light transmitting member which is disposed in an optical path between the scale and the light detecting section. The optical encoder further includes a stray-light reduction element which is interposed between a surface of the first light transmitting member and a surface of the second light transmitting member, and which reduces stray light which does not contribute to signal detection.

14 Claims, 16 Drawing Sheets

OPTICAL ENCODER HAVING A STRAY-LIGHT REDUCTION ELEMENT FOR REDUCING STRAT-LIGHT

CROSS-REFERENCE TO RELATED APPLICATION

The present application is based upon and claims the benefit of priority from the prior Japanese Patent Application No. 2008-086382 filed on Mar. 28, 2008; the entire contents of which are incorporated herein by reference.

BACKGROUND OF THE INVENTION

1. Field of the Invention

The present invention relates to an optical encoder.

2. Description of the Related Art

In recent years, there has been a progress in size reduction and thinning of encoders. While the size of one side is in a range of 10 mm to 20 mm in prevalent detecting heads, detecting heads of the size of a few mm square are also coming out in the market. In such trend of small sizing, even in packaging, a shape and a form in which small sizing is taken into consideration will be prevailing. For instance, thinning of conventional packages in which a metal or ceramics is used, and replacing the conventional packages by packages in which a packaging technology such as resin moulding is used, is considered to take place.

When the size of a detecting head becomes small, a distance between a light emitting section and a light receiving section inside the head also becomes short. Therefore, a possibility that the proportion of the quantity of light entering the light receiving section via the interior of the head upon being emitted from the light emitting section, occupied in the quantity of detected light becomes high due to a stray light inside the detecting head.

In many cases, an upper portion of an encoder head is covered by glass or sealed by a transparent resin for protecting the detecting head. In such cases, there is a possibility that, light outgoing from a light source enters the light receiving section upon being reflected at an inner surface of the upper portion of the head. Particularly, when the thickness of the encoder head is reduced for making the encoder head small, the angle of reflection at the inner surface of the head generally becomes large, and when the angle of reflection becomes wider than the angle of total reflection, the amount of light entering the light receiving section increases rapidly.

Moreover, regarding light which has undergone multiple reflections at the interior of the encoder head, because of small sizing, more amount of such light tends to enter the light receiving section compared with a conventional head.

This stray light such as the internally reflected light becomes a noise component at the time of generating a position detection signal. The noise component due to the stray light may become a cause of an extreme deterioration of the SN ratio of the position signals. When predetermined signal-amplification is carried out for maintaining an output level such as amplitude of the position signals, there is a possibility that the signal level saturates due to an influence of the large noise component.

When an attempt is made to avoid the signal saturation due to the noise component, there is a need to add an extra process of eliminating the noise component, and there is a possibility that measures have to be taken against the signal deterioration due to the noise component eliminating process.

An example of conventional optical encoders in which, an attention has been paid to the size reduction and thinning is an optical encoder disclosed in Japanese Patent Application Laid-open Publication No. 2005-156549). In FIG. 15, a reflection-type optical encoder which has a light emitting element 402 and photoelectric conversion element arrays 403 and 404 on the side of a head portion 414 is shown. The light emitting element 402 and the photoelectric conversion element arrays 403 and 404 are covered by a transparent optical member 405, and the transparent optical member 405 in a state of covering these components is a packaging member. The light emitting element 402 and the photoelectric conversion element arrays 403 and 404 are disposed on a substrate 401, and the head portion 414 is arranged facing patterns 420 and 421 on a scale disc 430. Conditions such as the following are added in this conventional example. In other words, when a distance from the light emitting element 402 up to the farthest location of the light receiving surfaces of the photoelectric conversion element arrays 403 and 404 is let to be D, a distance from the light receiving surface of the light emitting element 402 and the photoelectric conversion element arrays 403 and 404 up to the surface of the transparent optical member 405 is let to be G, and the angle at which reflectivity at the inside surface of the transparent optical member 405 is 10% is let to be θ, a thickness G is set such that the following expression (A) holds true.

$$G \geq D/(2 * \tan \theta) \quad (A)$$

For facilitating the size reduction by molding the light emitting element 402 and the photoelectric conversion element arrays 403 and 404 in the head portion 414 by the transparent optical member 405, when a thickness of the transparent optical member 405 which is a protective member, is reduced, light emitted from the light emitting element 402, and reflected light which is reflected at an inner surface of the transparent optical member 405 is incident on the photoelectric conversion element arrays 403 and 404, and the SN ratio of a signal is deteriorated. Therefore, the thickness of the transparent optical member 405 is let to be not less than a fixed value, and the reflectivity from the inside of the transparent optical member 405 is let to be not more than 10%.

In this manner, in the optical encoder disclosed in Japanese Patent Application Laid-open Publication No. 2005-156549, an attempt is made to avoid a problem of internally reflected light by making the transparent optical member 405 substantially thick.

However, in the optical encoder disclosed in Japanese Patent Application Laid-open Publication No. 2005-156549, for making the ratio of a thickness of a resin to a size of the head portion 414 to be not less than a certain constant value, there is a possibility that the disclosed encoder is not satisfactory for thinning of the head. Moreover, by making the transparent optical member 405 substantially thick, it is necessary to have a large working distance of a detection system, and there is a possibility that degrees of freedom in designing will be restricted.

Furthermore, when a mold resin is used for packaging of the detecting head, there is thermal expansion and contraction, and a significant change in hardness of the mold resin due to a temperature change. An example in which, a mold resin is used in the packaging is shown in FIG. 16. In FIG. 16, a head portion 514 is disposed to face a scale 530. In the head portion 514, an LED light source 502, a light receiving element 503, and electrodes 540 and 541 for the LED light source 502, are disposed on a substrate 501, and a glass member 550 is disposed between the light receiving element 503 and the LED light source 502, and the scale 530. The electrode 540 on the LED light source 502 and the electrode 541 on the substrate 501 are electrically connected by a wire 542. The members disposed on the substrate 501 and the members stacked further are covered by a mold resin 505. In an example shown in FIG. 16, when a resin thickness of the mold resin 505 is made large, problems such as breaking of the wire 542, a crack 560 in the mold resin 505, and a split 561 in the glass member 550 tend to occur. Therefore, it becomes difficult to secure reliability, and there is a possibility of an increase in costs for measures to be taken in designing and manufacturing.

SUMMARY OF THE INVENTION

The present invention is made in view of the abovementioned issues, and an object of the present invention is to provide an encoder which is not affected easily by the stray light at the interior of the head, and which is suitable for size reduction and thinning.

To solve the abovementioned issues and to achieve the object, according to the present invention, there is provided an optical encoder including a scale which is installed on one member of which, displacement is detected, and a detecting head which is installed on the other member which moves relatively with respect to the first member, and is disposed facing the scale, and a predetermined optical pattern in the direction of relative movement is provided on the scale, and the detecting head includes a light emitting section which irradiates predetermined light on the scale, a light detecting section which includes a light receiving surface which receives, via the optical pattern, light irradiated on the scale from the light emitting section and which detects light distribution formed on the light receiving surface, a first light transmitting member which is disposed in the optical path between the light emitting section and the scale, and a second light transmitting member which is disposed in the optical path between the scale and the light detecting section, and further comprising:

a stray-light reduction element which is interposed between the surface of the first light transmitting member and the surface of the second light transmitting member, and which reduces stray light which does not contribute to signal detection.

In the optical encoder according to the present invention, it is preferable that at least one of the surfaces of the first light transmitting member and the second light transmitting member is the stray-light reduction element, and reduces the stray light by an optical function of an interface as the stray-light reduction element.

In the optical encoder according to the present invention, it is desirable that the stray-light reduction element is let to be a member arranged between the first light transmitting member and the second light transmitting member, and reduces stray light by an optical function of the member as the stray-light reduction element.

In the optical encoder according to the present invention, it is desirable that at least one of the surfaces of the first light transmitting member and the second light transmitting member, and one of a member and a space between the first light transmitting member and the second light transmitting member are the stray-light reduction elements, and it is possible to reduce the stray light by an optical function of the surface as the stray-light reduction element, and by the structure and arrangement of one of the member and the space as the stray-light reduction element.

In the optical encoder according to the present invention, it is preferable that a member is disposed between the first light transmitting member and the second light transmitting member, and the member is a stray-light reduction element, and reduces the stray light by a combination of the optical function and the arrangement of the member as the stray-light reduction element.

In the optical encoder according to the present invention, the stray-light reduction element may be disposed or formed only at a position where the element does not contribute at all to signal detection.

In the optical encoder according to the present invention, it is preferable that each surface of the first light transmitting member and the second light transmitting member includes at least one surface including a portion through which light passes, which is involved in signal detection, and at least one surface which is not involved in signal detection, and the stray-light reduction element is disposed or arranged on at least one surface not involved in signal detection, of the first light transmitting member and the second light transmitting member.

In the optical encoder according to the present invention, it is desirable that excluding the first light transmitting member and the second light transmitting member, in the detecting head, at least the light emitting section, the light detecting section, and wiring members do not protrude from the stray-light reduction element.

In the optical encoder according to the present invention, a shape of the first light transmitting member and a shape of the second light transmitting member may be determined in advance before mounting.

In the optical encoder according to the present invention, it is preferable that the first light transmitting member and the second light transmitting member are made of a material which does not undergo plastic deformation at the time of mounting.

In the optical encoder according to the present invention, it is desirable that the first light transmitting member and the second light transmitting member are made of a material which does not melt at the time of mounting.

In the optical encoder of the present invention, the position of the first light transmitting member and the position of the second light transmitting member may be adjustable at the time of mounting.

In the optical encoder of the present invention, it is preferable that handling of the first light transmitting member and the second light transmitting member is possible at the time of mounting.

In the optical encoder of the present invention, the first light transmitting member may be stacked on a surface facing the scale of the light emitting section, and the second light transmitting member may be stacked on a surface facing the scale of the light detecting section.

DETAILED DESCRIPTION OF THE PREFERRED EMBODIMENTS

Exemplary embodiments and modified embodiments of an optical encoder according to the present invention will be described below in detail with reference to the accompanying diagrams. However, the present invention is restricted to the embodiments and the modified embodiments described below.

Figure 1:
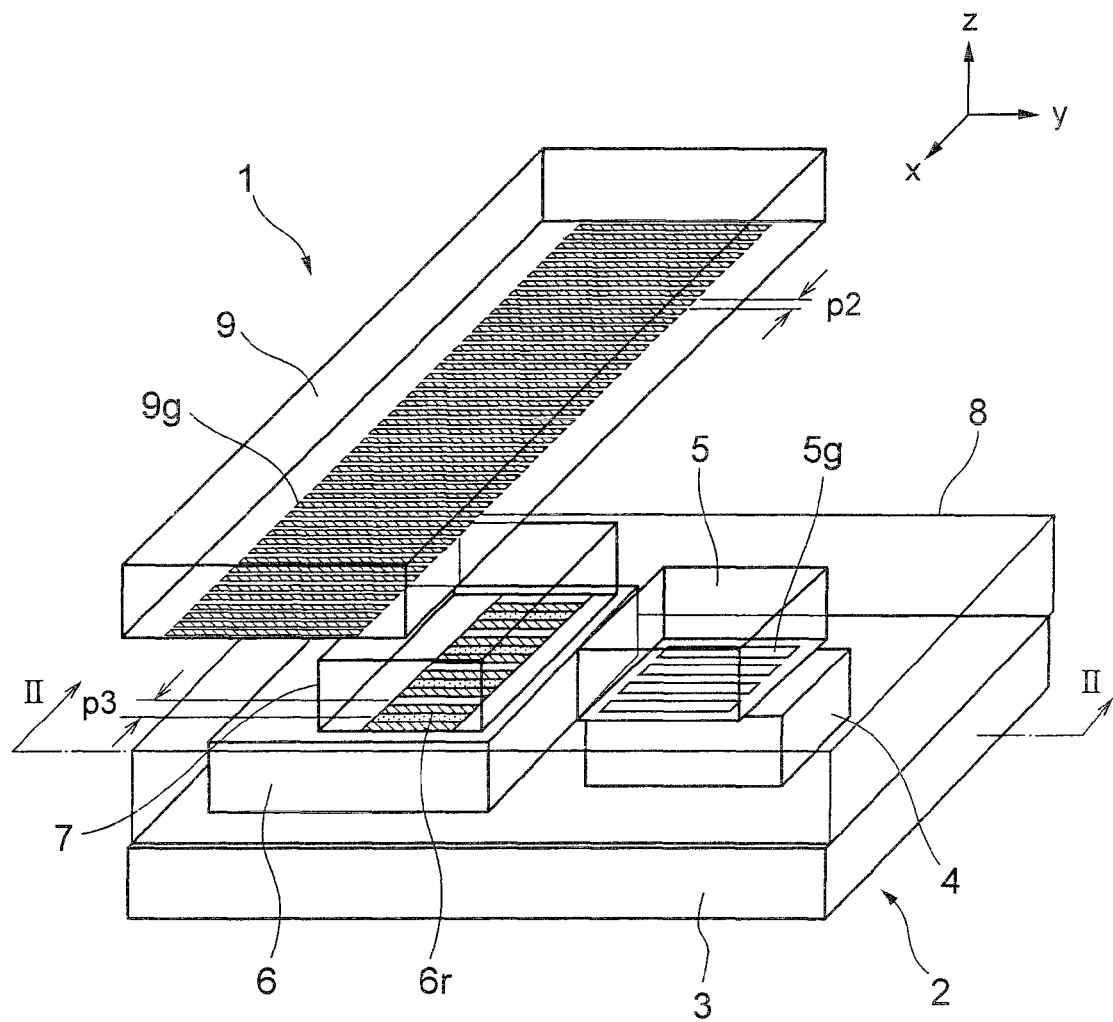
FIG. 1 is a perspective view showing a schematic structure of an optical encoder according to a first embodiment of the present invention.
Figure 2:
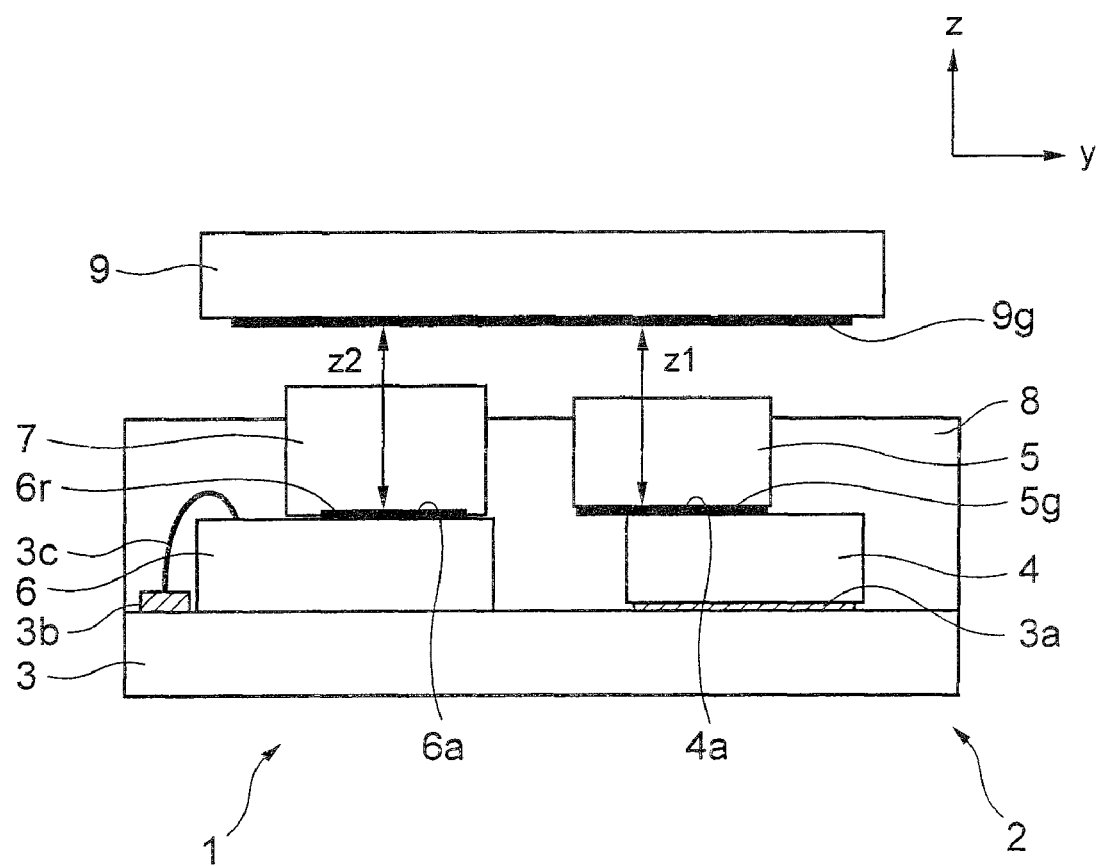
FIG. 2 is a cross-sectional view orthogonal to the direction of movement of a scale according to the first embodiment of the present invention, which is taken along a line II-II in FIG. 1.

FIG. 1 is a perspective view showing a schematic structure of an optical encoder according to a first embodiment of the present invention and FIG. 2 is a cross-sectional view orthogonal to x direction, which is the direction of movement of a scale. FIG. 2 is a cross-sectional view taken along a line II-II in FIG. 1. In the following description z direction is let to be a vertical direction, x direction is let to be a longitudinal direction of the scale, and y direction is let to be a direction perpendicular to z direction and x direction.

In the following embodiments and modified embodiments, examples of reflection-type encoders are described.

To start with, a structure of an optical encoder 1 will be described below.

The optical encoder 1 includes a sensor head 2 and a scale 9 which is disposed facing the sensor head 2. The sensor head 2 includes a light source 4 and a photodetector 6, which are disposed separately. The light source 4 is disposed on a circuit board 3, and the photodetector 6 has at an interior, a light receiving area 6r made of a light receiving element array having a pitch p3 in x direction.

The light source 4, for example, is a mold LED of a surface-mounting chip type, and a mold resin upper surface which functions as the light outgoing surface 4a of the mold LED, is flat.

A first light transmitting member 5 is stuck on the light outgoing surface 4a of the light source 4 by an optically transparent adhesive. A first grating 5g which is an optical pattern having a pitch p1 in x direction is formed on the bottom surface toward the light source 4 of the first light transmitting member 5. A light shielding pattern may be formed on a portion other than the area necessary for the first grating 5g.

A second light transmitting member 7 is stuck with an optically transparent adhesive on the light receiving surface 6a of the light receiving element array of the photodetector 6. A light shielding pattern is formed on a surface of the second light transmitting member 7, facing the light receiving surface of the light receiving element array, excluding a light receiving portion.

Members cut out by processing from a parallel flat plate of glass are used for the first light transmitting member 5 and the second light transmitting member 7, which has a rectangular parallelepiped shape with its upper and lower surfaces flatly polished. Side surfaces of the first light transmitting member 5 or the second light transmitting member 7 may not have been subjected to any particular optical processing, but may have a stray-light reduction function such as shielding or attenuating light, diffusing transmitted light, and deflecting light in a specific direction different from a direction toward the photodetector 6. Here, the side surfaces of the first light transmitting member 5 or the second light transmitting member 7 are let to have a light shielding pattern formed thereon.

The first light transmitting member 5 and the second light transmitting member 7 are enclosed by a resin material 8 for protecting a sensor head, excluding an upper surface, a bottom surface in contact with the light source 4, and a surface in contact with the photodetector 6. For thermal characteristics of the first light transmitting member 5, the second light transmitting member 7, the light shielding member which forms the light shielding pattern, and the optically transparent adhesive, it is preferable to use a member having characteristics same as of a Si-based semiconductor material which forms the photodetector 6.

Moreover, the scale 9 has the second grating 9g which is an optical pattern displacing relatively with respect to the sensor head 2. The second grating 9g is an optical pattern formed at a predetermined pitch p2 in x direction in which the scale 9 and the sensor head 2 move relatively.

Next, an arrangement of an optical system will be described below.

As shown in FIG. 2, it has been known that with an optical distance from the first grating 5g on the first light transmitting member 5 up to the second grating 9g on the scale 9 let to be z1, an optical distance from the second grating 9g on the scale 9 up to the light receiving surface of the photodetector 6 let to be z2, and the wavelength of light emitted from the light source let to be λ, by letting an arrangement to be such that the light source 4, the scale 9, and the photodetector 6 are disposed such that, there exists a natural number n which satisfies the following expression (1)

$$1/z1+1/z2=\lambda/(np2^2) \tag{1}$$

it is possible to make appear a magnified diffraction image pattern of the scale on the light receiving element array, and when the photodetector 6 is disposed at a predetermined position, it is possible to detect the amount of displacement of the scale 9. Here, in expression (1), when a refractive index and a thickness of an i-th substance (where i is a natural number) or a space between the first grating 5g and the second grating 9g are let to be ni and ti respectively, a refractive index and a thickness of a j-th substance (where j is a natural number) or a space between the second grating 9g and the light receiving surface 6a are let to be nj and tj respectively, the optical distance between the first grating and the second grating 9g is defined as z1=Σ ti/ni, and the optical distance between the second grating 9g and the light receiving surface 6a is defined as z2=Σ tj/nj.

In this arrangement, for size reduction of the structure, z1 and z2 which satisfy a condition n=1 are adopted, and in a combination of z1 and z2 which satisfy expression (1), it is let to be the smallest value. Further, in expression (1), an arrangement which satisfies z1=z2 is adopted. In this case, magnification is double, and p1=p3=2p2.

Next, the structure of the photodetector 6 will be described below.

Figure 3:
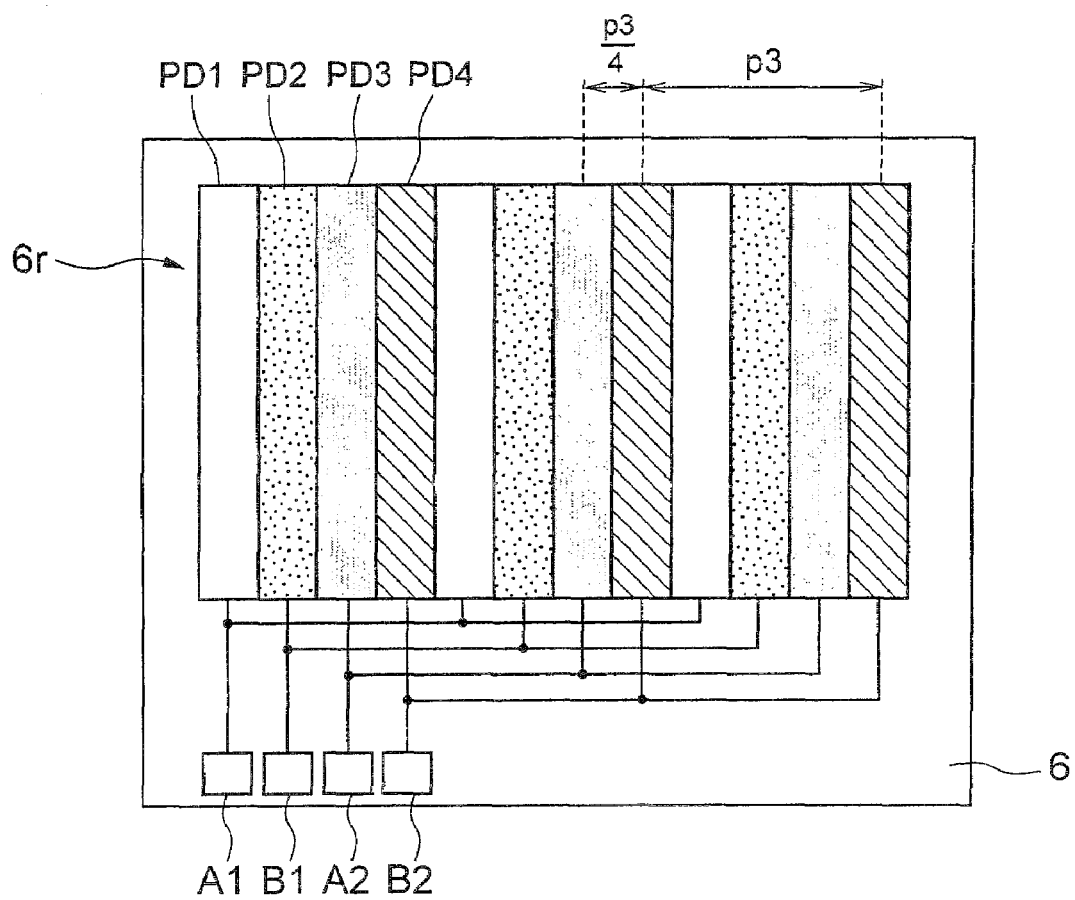
FIG. 3 is a plan view showing an enlarged form of a structure of a light receiving element array of a light receiving area formed on a photodetector according to the first embodiment of the present invention.

FIG. 3 is a plan view showing an enlarged form of the structure of the light receiving element array of the light receiving area 6r formed on the photodetector 6. A combination of four photodiodes PD1, PD2, PD3, and PD4 having a rectangular shape is let to be one set, and a plurality of such combinations is arranged to form the structure. PD outputs are joined (linked) at every four, and four signals are output. Four electric signals are output by four electrode pads A1, B1, A2, and B2. Pitch of PDs connected at every four is p3, and that is, any PD is disposed to be at only p3/4 from the adjacent PD.

Next, an optical arrangement of the light source 4 and the first light transmitting member 5 will be described below.

Light emitted from a light emitting section of the light source 4 is transmitted through the first light transmitting member 5, and at an interface with an outside (normally air), the refractive index of a medium outside is let to be n1, the refractive index of the first light transmitting member 5 is let to n2, the refractive index of the second light transmitting member 7 is let to be n3, the incident angle of the outgoing refracted light transmitted to the outside is let to be θ1, the refraction angle of the light with a normal of the interface is let to be θ2, and n3=n2.

In this case, the following expressions hold true according to Snell's law.

Although the description in general is made, in the first embodiment, the medium of outside is assumed to be air, and n1=1.

$$n1 \cdot \sin\theta1 = n2 \cdot \sin\theta2 \tag{2}$$

The first light transmitting member 5 is formed of a material having same or nearly same thermal characteristics as of the photodetector 6 such as a light transmitting resin or glass, and a Si semiconductor which forms a signal processing circuit, which is not shown in the diagram, and n2>n1. When an angle at which, light beam undergoes total reflection at the surface of the first light transmitting member 5 is let to be a critical angle θc, the following expression (3) holds true.

$$\theta c=\sin^{-1}(n1/n2) \tag{3}$$

When an arbitrary point in a light emitting portion of the light source and an arbitrary point in the light receiving area 6r of the photodetector 6 are taken, and the position of each point is changed, a maximum value and a minimum value of a distance from the point in the light emitting section of the light source 4 and the point in the light receiving area of the photodetector 6, at which a component parallel to the scale may be taken, are let to be D and d respectively. Moreover, a thickness from the light source 4 up to the surface of the first light transmitting member 5 is let to be G, a distance from the surface of the first light transmitting member 5 up to the second grating 9g of the scale 9 is let to be G0, a distance from the second grating 9g of the scale 9 up to a surface of the second light transmitting member 7 is let to be G0', and a thickness from the surface of the second light transmitting member 7 up to the photodetector 6 is let to be G'.

In this case, the sensor head 2 according to the first embodiment has a structure which satisfies the following expression (4).

$$(G+G')<D/\tan\theta c \tag{4}$$

Figure 4:
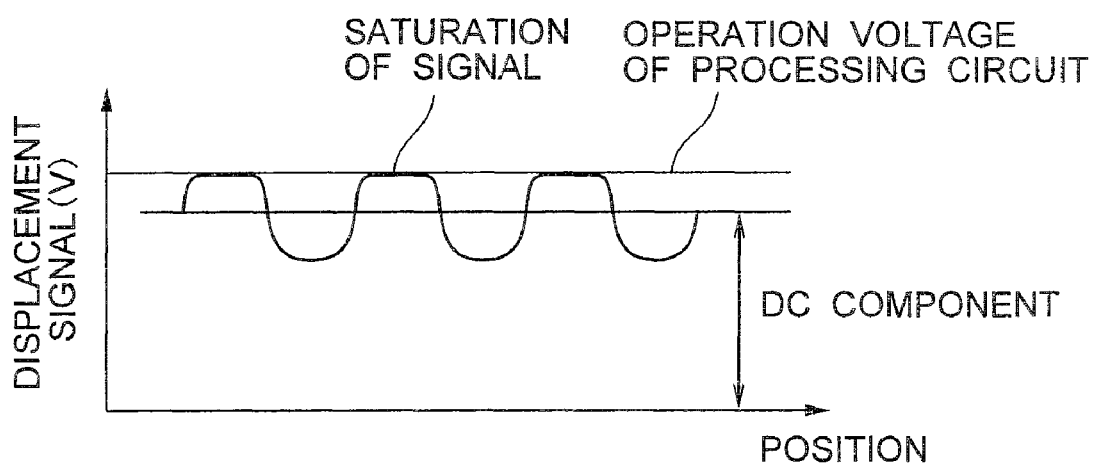
FIG. 4 is a graph showing a detection signal in the photodetector according to the first embodiment of the present invention, in which, a displacement signal (unit volts) detected is on a vertical axis and a position is on a horizontal axis.

D which satisfies expression (4) is a thickness of the first light transmitting member 5 such that when the first light transmitting member 5 is formed in a wide range, the light which outgoes from the light source 4, is incident to the interface of resin and the outside, and undergoes total reflection, can be, after the reflection directly incident on the light receiving section. In a case of a (conventional) structure in which a space between the first light transmitting member 5 and the second light transmitting member 7 is connected, internally reflected light is incident directly on the light receiving area, and a DC component in a detection signal rises up as shown in FIG. 4. Here, FIG. 4 is a graph showing a detection signal in the photodetector 6, in which, a displacement signal (unit volts) detected is on the vertical axis and a time (unit seconds) is on the horizontal axis.

In expression (4), a case in which, G is not necessarily equal to G' and G0 is not necessarily equal to G0' is assumed. When G=G' and G0=G0', expression (4) is replaced by the following expression (5).

$$G<(D/2)/\tan\theta c \tag{5}$$

The resin material 8 is for protecting members inside the sensor head 2, and a transparent clear mold resin is used as the resin material 8. Consequently, from a point of protection of the member, only electrical wiring portion and a surrounding of electrodes at the interior may be protected. Moreover, according to the circumstances, the entire resin material 8 may be eliminated.

An electrode bonding wire 3c and an electrode 3b of the photodetector 6 are embedded in the resin material 8. In this structure, the electrode bonding wire 3c is a member coming up to the highest position excluding the first light transmitting member 5, the second light transmitting member 7, and the resin material 8, out of the members embedded in the resin material 8, and the member at the highest position is entirely embedded in the resin material 8.

In FIG. 1 and FIG. 2, an upper surface of the first light transmitting member 5 and an upper surface of the second light transmitting member 7 are higher than the resin material 8. However, the resin material 8 being optically transparent, from a point of an improvement in reliability, the first light transmitting member 5 and the second light transmitting member 7 may be embedded completely in the resin material 8. When the first light transmitting member 5 and the second light transmitting member 7 are to be embedded completely in the resin material 8, it is necessary to take into consideration separately the influence of internally reflected light.

In the first embodiment, the first grating 5g is disposed toward the light source 4 inside the sensor head 2, and the light source 4 and the photodetector 6 having the light receiving area 6r at the interior are disposed separately. However, as long as the sensor head has a structure of a reflection type having a light emitting section and a light receiving section, expressions from expression (2) to expression (5) are applicable to any type of encoder, and the operation and the effect of prevention of stray light of the present invention including the first embodiment hold true.

A transparent resin is used in (for) the resin material 8. However, its color and material are not restricted provided that it is a member having an effect of protecting the members inside the sensor head 2. Moreover, a plurality of materials may be combined and may be formed to be multilayered.

The shape and the surface condition, which is a microscopic form condition, of the side surfaces of the first light transmitting member 5 and the second light transmitting member 7 may be set in order to shield or reduce light reaching the side surface of the second light transmitting member 7 upon being emitted from the side surface of the first light transmitting member 5. In addition, a combination of their shapes and arrangement may be set together. Concretely, the condition and the shape of the surfaces may be let to be such that light is diverged, and the combination of the surface shape and the arrangement may be let to be such that, light is deflected from the light receiving area 6r of the photodetector 6.

In the optical encoder according to the first embodiment, the thickness of the sensor head 2 is made thin so that expression (4) is satisfied. However, the thickness of the sensor head 2 may not be made thin in such manner provided that it is possible to reduce the stray light without thinning.

The optical encoder 1 is of a type that satisfies expression (1). However, a stray-light preventing function inside the sensor head 2 will not necessarily restrict the detection principle of the encoder, provided that there is a structure in which the sensor head 2 has a light emitting section (light source 4) and a light receiving section (photodetector 6). For example, the encoder may be of a type that does not use optical interference and detects only the intensity of reflection, or of a type in which, only diffracted light of a specific order is used.

The optical encoder 1 having the structure described above operates as follows.

Since the photodetector 6 is disposed such that the condition in expression (1) is satisfied, light outgoing from the light source 4 is diffracted or reflected by the second grating 9g on the scale 9, and a magnified light and dark image of the pattern of the second grating 9g is formed on the light receiving area 6r. This magnified image pattern moves according to the relative movement of the sensor head 2 and the scale 9, and this movement is detected by a light detecting section.

Moreover, in expression (1), an arrangement is such that z1=z2 is satisfied, and a light and dark diffraction pattern having a pitch, double the scale pitch, is formed on the light receiving area 6r. When the scale 9 moves relatively with respect to the sensor head 2, pseudo sine-wave signals output from the four electrode pads A1, B1, A2, and B2, the phases of which differ mutually by ¼ cycle can be obtained.

The detection signals will be described below by using FIG. 4 and FIG. 5.

Figure 5:
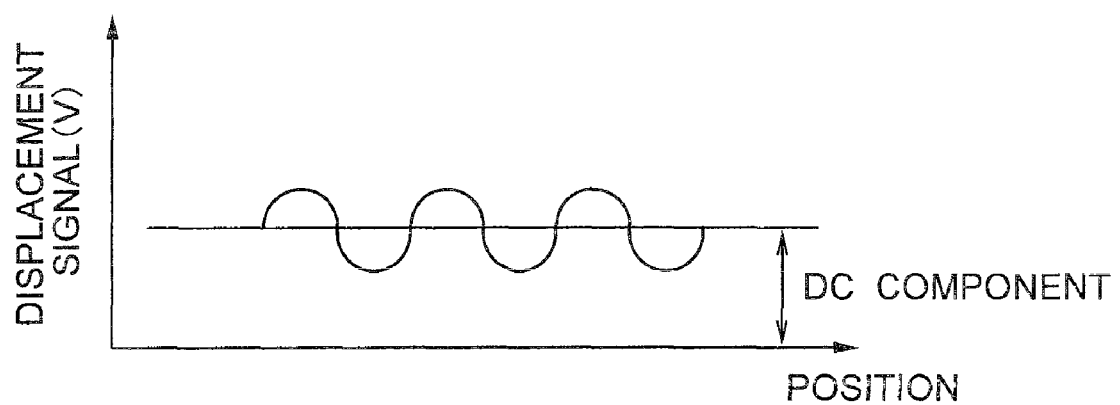
FIG. 5 is a graph showing a detection signal in the photodetector according to the first embodiment of the present invention, in which, the displacement signal (unit volts) detected is on the vertical axis and a position is on the horizontal axis.

In FIG. 4 and FIG. 5, the vertical axis indicates voltage and the horizontal axis indicates position. When the sensor head 2 and the scale 9 of the optical encoder 1 move relatively at a constant speed, the horizontal axis may be assumed to indicate time. FIG. 4 indicates one waveform of the signals output from the four electrode pads whose phases differ mutually by ¼ cycle. In an example of FIG. 4, the amount of the stray light being large, a DC component becomes large, and therefore, the detection signal is saturated. FIG. 5 indicates one of the signals output from the four electrode pads whose phase differ mutually by ¼ cycle. In an example of FIG. 5, there is no influence of saturation of the detection signals due to the stray light. For eliminating common mode noise and DC component in the detection signals after current-voltage conversion, and further for applying gain, the sensor head 2 takes a difference of two sets of signals which have mutually opposite phase, out of the four signals whose phases differ mutually only by ¼ cycle, and obtains A-phase signal and B-phase signal which are two pseudo sine-wave signals having a phase difference of 90°.

These pseudo sine-wave signals are binarized inside or outside the sensor head 2 in order to detect the displacement, or by processing the signals with an interpolation processing circuit, it is possible to detect the amount of displacement with higher resolution. When a saturated signal is used as in FIG. 4, an influence of the saturation also appears on AB-phase signals, which are differential signals, and a distortion from a sine wave becomes large. Particularly, when the DC component becomes extremely high, and the signal in FIG. 4 is in a saturated state all the time, the amplitudes of the AB-phase signals becomes 0. Conversely, when the effect of the stray light is small and the DC component is small, a stable wave as shown in FIG. 5 is obtained, and the AB-phase signals, which are the differential signals, also have amplitude of a desired value.

The shape and the surface form of the side surface of the first light transmitting member 5 or the second light transmitting member 7 is such that light outgoing from the side surface of the first light transmitting member 5 and reaching the side surface of the second light transmitting member 7 is shielded or reduced. In other words, the side surface of the first light transmitting member 5 or the side surface of the second light transmitting member 7 has a shape as a stray-light reduction element. Therefore, the amount of light which passes through the side surface of the first light transmitting member 5 or the second light transmitting member 7 is reduced, and the amount of light which is directed toward the light receiving area 6r of the photodetector 6 is also reduced.

Concretely, the light emitting section of the light source 4 and the light receiving section of the photodetector 6 are not in contact with a common optically transparent member, and are facing the first light transmitting member 5 and the second light transmitting member 7 which are separate members. In other words, the surface of the first light transmitting member 5, the surface of the second light transmitting member 7, and the resin material 8 or the space between the first light transmitting member 5 and the second light transmitting member 7 are formed as the stray-light reduction element. Therefore, the amount of stray light directed toward the photodetector 6 upon being reflected at the inner side of the upper surface of the first light transmitting member 5 as the stray-light reduction element, is decreased significantly.

Moreover, the height of the light outgoing surface 4a of the light source 4 and the height of the light receiving surface 6a of the photodetector 6 are matched. In such a structure, the light outgoing from the side surface of the first light transmitting member 5 being basically directed obliquely upward, even when this light directed obliquely upward enters (is incident on) the side surface of the second light transmitting member 7, it is not directed toward the light receiving surface 6a of the photodetector 6.

Moreover, the first light transmitting member 5 and the second light transmitting member 7 are made of glass having a rectangular parallelepiped shape, and have a refractive index of approximately 1.5. Whereas, a surrounding area of the sensor head 2 is a substance or a space having a refractive index lower than the refractive index of the first light transmitting member 5, such as an atmosphere of a refractive index 1. In this case, the refraction angle of light outgoing from a flat (plane) surface such as the side surface of the first light transmitting member 5 to a substance or a space having a low refractive index becomes larger than the angle of incidence, and it becomes diffused light. Therefore, the amount of light outgoing from the side surface of the first light transmitting member 5 and reaching the second light transmitting member 7 is smaller as compared to a case in which, the first light transmitting member 5 and the second light transmitting member 7 are integrated. In other words, it is possible to reduce the amount of stray light, not contributing to the signal detection, which enters the second light transmitting member 7.

It is possible to realize the abovementioned operation even when any optical process is not carried out in particular on the side surface of the first light transmitting member 5 or the side surface of the second light transmitting member 7.

In the optical encoder 1 having the abovementioned structure and operation, the following effect is shown.

When a case in which, a light transmitting member extends over an entire surface of a sensor head toward a scale as in the conventional optical encoder, and light reflected at that surface is directly incident on a light receiving area of a photodetector is taken into consideration, as shown in FIG. 4, the level of the DC component of each phase signal increases, and the signal amplitude of each phase becomes relatively small as compared to the magnitude of the DC component. Therefore, the signals tend to be saturated, and when the signal is saturated practically, a malfunction occurs in detection of the amount of displacement. Moreover, even if the signals are not saturated practically, when the amplification of the signal amplitude being restricted because of the large DC component level, there is a possibility that the amplitudes of the detected pseudo sine-wave signals, or the SN ratio thereof are declined.

Whereas, in the optical encoder 1 according to the first embodiment, the light transmitting member being disposed by isolating the first light transmitting member 5 and the second light transmitting member 7 which are separate components, light reflected at the scale-side surface of the first light transmitting member 5 does not enter the optical detector 6 directly from the surface of the first light transmitting member 5. Moreover, the side surfaces of the first light transmitting member 5 and the second light transmitting member 7 are arranged to reduce the amount of light that is transmitted within the sensor head 2 between the two light transmitting members, and the amount of light that is incident on the photodetector 6 through a member or a space in between is also reduced.

The structure being made as described above, when compared with a conventional case in which, the light transmitting member extends over the entire scale-side surface of the sensor head, and the light reflected at that surface is directly incident on the light receiving area on the photodetector, the DC components of the detected signals are reduced. Accordingly, it is possible to reduce a possibility of signal saturation, and to amplify the signals by an even larger gain. As a result, it is possible to achieve the desired level of the detection signals and an appropriate SN ratio without any problem which should have been achieved originally if the levels of the DC components are low.

Next, it is preferable that the side surfaces of the first light transmitting member 5 and the second light transmitting member 7 have a shape and a surface condition such that, as a stray-light reduction element, the light outgoing from the side surface of the first light transmitting member 5 and reaching the side surface of the second light transmitting member 7 is shielded or reduced. Accordingly, the amount of light passing through the side surface of the first light transmitting member 5 or the side surface of second light transmitting member 7 is reduced, and moreover, the amount of light directed toward the light receiving area 6r of the photodetector 6 is reduced. As a result, it is possible to have a high SN ratio for a signal detected by the photodetector 6.

It is preferable that the combination of the shape and the arrangement of the side surfaces of the first light transmitting member 5 and the second light transmitting member 7 is such that, as a stray-light reduction element, the light outgoing from the side surface of the first light transmitting member 5 and reaching the side surface of the second light transmitting member 7 is shielded or reduced. Accordingly, the amount of light passing through the side surface of the first light transmitting member 5 or the side surface of the second light transmitting member 7 is reduced, and the amount of light directed toward the light receiving area 6r of the photodetector 6 is reduced. As a result, it is possible to have a high SN ratio for a signal detected by the photodetector 6.

Next, the combination of the shape and the arrangement of the side surfaces of the first light transmitting member 5 or the second light transmitting member 7 for reducing sufficiently the amount of light outgoing from the side surface of the first light transmitting member 5 and reaching the side surface of the second light transmitting member 7 will be described below concretely.

The first light transmitting member 5 has a rectangular parallelepiped shape, and no optical process has been carried out on the side surface thereof.

The light outgoing surface 4a of the light source 4 and the light receiving surface 6a of the photodetector 6 are not in contact with the common light transmitting member, and are facing the first light transmitting member 5 and the second light transmitting member 7 which are separate components. Therefore, an area of the upper surface of the first light transmitting member 5 is narrowed, and the amount of the stray light directed toward the photodetector 6 upon being reflected at the interior of the upper surface of the first light transmitting member 5 is decreased significantly. Moreover, since the height of the light outgoing surface 4a of the light source 4 and the height of the light receiving surface 6a of the photodetector 6 are matched, the light outgoing from the side surface without passing through the upper surface of the first light transmitting member 5 is basically directed obliquely upward. The light directed obliquely upward may be incident on the side surface of the second light transmitting member 7, but is not directed toward the light receiving surface 6a of the photodetector 6 directly.

Moreover, the first light transmitting member 5 and the second light transmitting member 7 are made of glass, and the refractive index thereof is 1.5. Whereas, the surrounding (area) of the sensor head 2 is a substance or a space having a refractive index lower than the refractive index of the first light transmitting member 5, such as an atmosphere of a refractive index 1. In this case, the refraction angle of light outgoing from a flat surface such as the side surface of the first light transmitting member 5 to a substance or a space having a lower refractive index becomes larger than the angle of incidence, and it becomes diffused light. Therefore, the amount of light outgoing from the side surface of the first light transmitting member 5 and reaching the second light transmitting member 7 is small as compared to the case in which, the first light transmitting member 5 and the second light transmitting member 7 are integrated. Therefore, the optical encoder 1 according to the present invention has the operation and the consequent effect of reducing the light outgoing from the first light transmitting member 5 and reaching the second light transmitting member 7.

The light which is used for the signal detection of the optical encoder 1 passes through the upper and the lower surface of the first light transmitting member 5 and the second light transmitting member 7. At least, the design and the arrangement are made such that the light which does not pass this portion does not become a signal which the optical encoder 1 has to detect essentially. On the other hand, the side surface of the first light transmitting member 5 and the side surface of the second light transmitting member 7 are arranged such that the amount of light that is transmitted between the two light transmitting members in the sensor head 2 is reduced. These stray-light reduction elements do not reduce the light that passes through the upper surface and the lower surface of the first light transmitting member 5 and the second light transmitting member 7. Consequently, only the DC component due to the stray light is reduced. Accordingly, it is possible to improve the SN ratio with the signal to be detected maintained.

When the first light transmitting member 5 and the second light transmitting member 7 are formed to be rectangular parallelepiped shaped having the upper surface and the lower surface flat, and four side surfaces, the light passing through the upper and the lower flat surfaces of the first light transmitting member 5 and the second light transmitting member 7 is used for the signal detection of the encoder, and the side surfaces other than the upper surface and the lower surface are arranged and formed as stray-light reduction elements.

In this manner, since the upper and the lower surfaces for the signal detection and the side surface used for the stray-light reduction are divided, the arrangement and the position of formation of the stray-light reduction elements become clear. Therefore, the arrangement and the formation become easy and also, checking at the time of testing becomes easy.

When the shape and the surface condition are processed after mounting the members, due to the balance with a series of mounting process, a processing method, a shape which can be processed, and an accuracy of the shape are susceptible to be constrained. Whereas, the first light transmitting member 5 and the second light transmitting member 7 are cut out from a parallel flat glass, and a surface processing is carried out according to the requirement, and the shape is determined in advance before mounting on the light source 4 and the photodetector 6. Therefore, by processing in advance sufficiently as required, it is possible to make the desired shape and the shape accuracy. Particularly, the upper surface and the lower surface of the first light transmitting member 5 and the second light transmitting member 7 are polished surfaces of parallel and flat glass, and optical characteristics of the surface are favorable as compared to optical characteristics in a case in which, only a resin is used or a case in which a resin is interposed in an optical path, and highly accurate signal detection is possible.

The first light transmitting member 5 and the second light transmitting member 7 are made of glass, and plastic deformation does not occur in an environment at the time of mounting. Particularly, there is no melting at a temperature of about 200° C. which is necessary at the time of sealing by the resin material 8. Therefore, it is possible to maintain the processed shape and the surface condition in advance.

Moreover, the first light transmitting member 5 and the second light transmitting member 7 are made of glass, and the upper surface and the lower surface thereof are a part of a parallel flat plate. Therefore, it is also possible to carry out handling at the time of mounting, by holding the side surfaces, and the upper surface and the lower surface which are parallel flat plates. Accordingly, it is possible to mount upon making a desired arrangement.

Further, for the same reason, a position adjustment inside the sensor head 2 becomes possible at the time of mounting. Therefore, it is anticipated that by the combination of highly accurate positioning, the shape, and the shape accuracy, the efficiency of the signal detection and the stray-light reduction effect can be close to those ideally designed.

The first light transmitting member 5 is stacked directly on a surface of the light source 4, facing the scale 9, and the second light transmitting member 7 is stacked directly on a surface of the photodetector 6, facing the scale 9. Therefore, it is possible to assemble the sensor head 2 compactly, particularly in a direction of thickness while carrying out the signal detection and the stray-light reduction.

By using the mold LED of chip type for surface mounting for the light source 4, it is not necessary to carry out wiring on an upper surface of the LED, and it becomes easy to mount the first light transmitting member 5 having the first grating 5g. Further, since the mold LED is sealed, it is highly versatile and reliable as compared to a bare LED. Therefore, there are merits of easy handling and the mounting of the encoder becoming easy.

Moreover, the light receiving element array is used in the photodetector 6, and in the light receiving element array, the efficiency of the signal detection in the detection area is high, and a compact structure for achieving a predetermined detection signal is possible.

In the sensor head 2, all the members except the first light transmitting member 5 and the second light transmitting member 7 are covered by the resin material 8, and the light source 4, the photodetector 6, the electrode bonding wire 3c are mounted such that they do not stick out from the resin material 8. Therefore, the resin material 8 functions as a protective member, and an improvement in reliability due to sealing is facilitated.

A first modified embodiment of the first embodiment will be described below while referring to FIG. 6.

Figure 6:
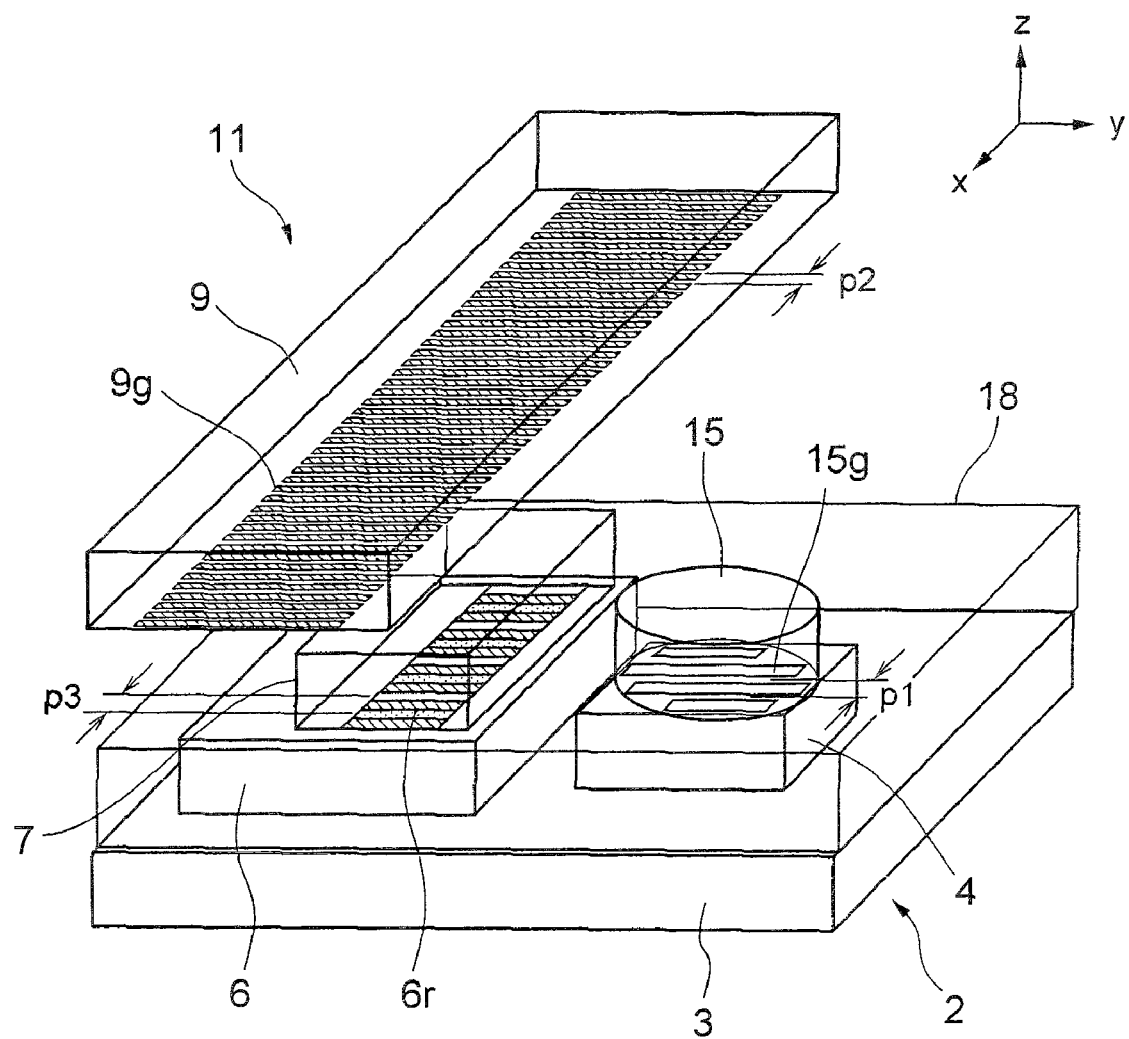
FIG. 6 is a perspective view showing a structure of an optical encoder according to a first modified embodiment of the first embodiment of the present invention.

FIG. 6 is a perspective view showing a structure of an optical encoder 11 according to the first modified embodiment of the first embodiment of the present invention. In FIG. 6, same reference numerals are assigned to members that are same as the members in the optical encoder 1 according to the first embodiment, and the description in detail of such members is omitted.

In the first modified embodiment, the resin material 8 in the first embodiment is replaced by a light shielding member 18, and the first light transmitting member 5 is replaced by a first light transmitting member 15 having a circular cylindrical shape. The first light transmitting member 15 has a circular cylindrical shape, and includes first grating 15g similar to the first grating 5g in the first embodiment. An optical process is not carried out in particular on side surfaces.

Any structure, operation, or their consequent effect, which reduce light directed in all directions which is emitted from the side surface of the first light transmitting member 15, or which reduce light incoming from the side surface of the second light transmitting member 7, is not necessarily required for the side surface of the first light transmitting member 15 and the second light transmitting member 7 since there is a stray-light reduction effect due to the light shielding member 18.

Moreover, an arrangement is made such that the light shielding member 18 covers a most portion of the side surfaces of the first light transmitting member 15 and the second light transmitting member 7 to shield light outgoing from the side surface of the first light transmitting member 15 and reaching the side surface of the second light transmitting member 7.

Moreover, when the light shielding member 18 is not perfectly opaque and allows the light to pass to some extent, or, when there may exist a path of light through the side surfaces of portions of the first light transmitting member 15 and the second light transmitting member 7, protruding upward from the light shielding member 18, which reaches the light detecting section, the shape, the surface condition, which is a microscopic form condition, and the combination of the shape and the arrangement of the side surface of the first light transmitting member 15 or the side surface of the second light transmitting member 7 may be set under a condition that shields or reduces the light reaching the side surface of the second light transmitting member 7 upon outgoing from the side surface of the first light transmitting member 15. Concretely, the condition and the shape of the surfaces may be let to be such that light is diverged, and the combination of the surface shape and the arrangement may be let to be such that, light is deflected from the light receiving area $6r$ of the photodetector 6.

As shown in FIG. 6, for the light shielding member 18 to shield the light outgoing from the side surface of the first light transmitting member 15 and the light reaching the side surface of the second light transmitting member 7, an arrangement is made such that, stray light outgoing from the light source 4 and transmitted through the interior of the sensor head 2, including light reflected internally at the first light transmitting member 15 is not detected by the photodetector 6.

Consequently, for the two reasons mentioned above, it is possible to secure a high S/N ratio for a signal detected by the photodetector 6.

Further, out of the light outgoing from the light source 4, it is possible to shield leaking light, if any, which is outgoing to outside via a side area of the first light transmitting member 15.

In the sensor head 2, all the members except the first light transmitting member 15 and the second light transmitting member 7 are covered by the light shielding member 18, and the light source 4, the photodetector 6, and the electrode bonding wire $3c$ are mounted such that they do not stick out from the light shielding member 18. Therefore, the light shielding member 18 which is a stray-light reduction element functions as a protective member, and an improvement in reliability due to sealing is facilitated.

In the first modified embodiment, no particular optical process is carried out on the side surface of the first light transmitting member 15. However, a function of reducing transmitting light may be imparted to the shapes of the first light transmitting member 15 and the second light transmitting member 7, or, a light scattering effect may be imparted to these surfaces, or, the light may be guided in a specific direction.

Figure 7:
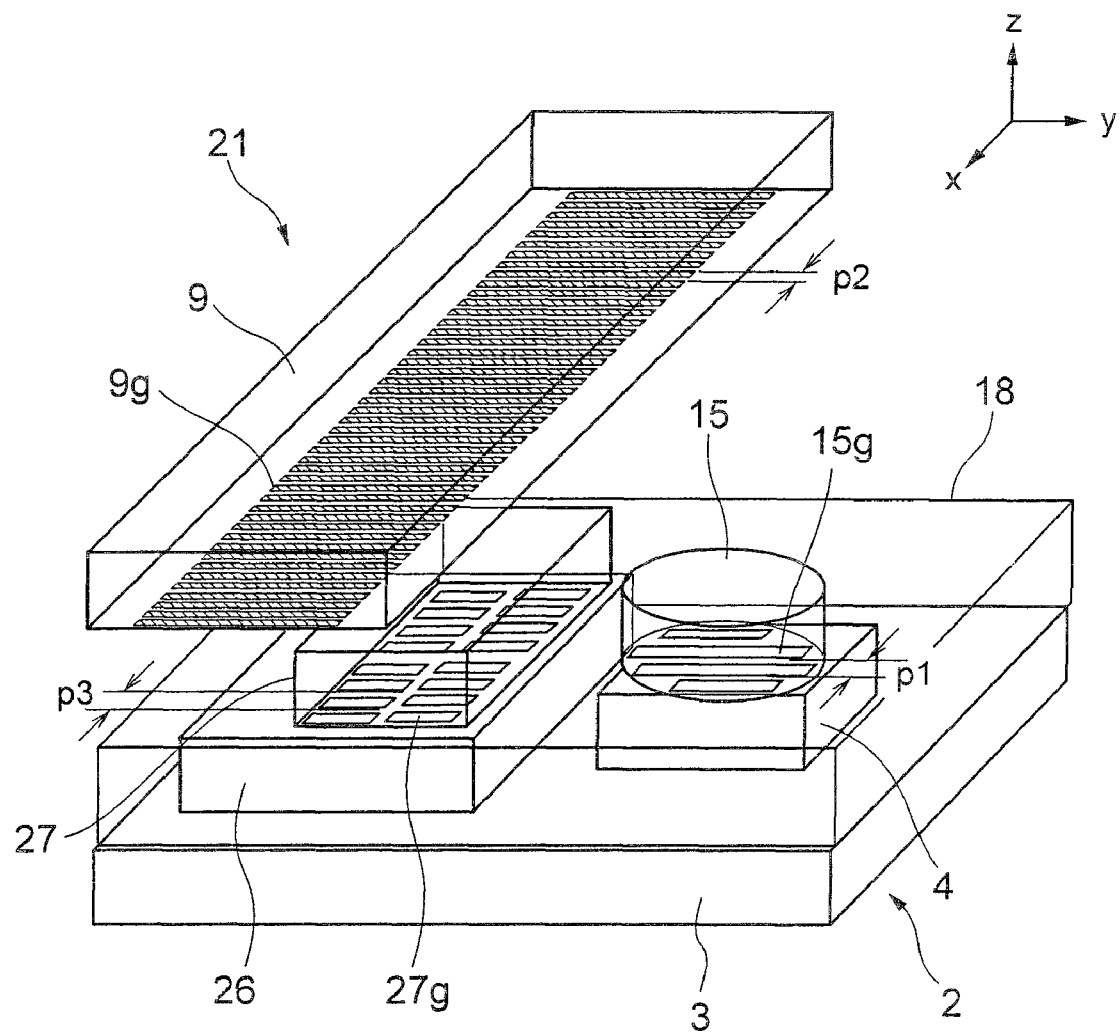
FIG. 7 is a perspective view showing a structure of an optical encoder according to a second modified embodiment of the first embodiment of the present invention.

Next, a second modified embodiment of the first embodiment will be described below while referring to FIG. 7. FIG. 7 is a perspective view showing a structure of an optical encoder 21 according to the second modified embodiment of the first embodiment of the present invention. In FIG. 7, same reference numerals are assigned to member that are same as the members in the optical encoder 1 according to the first embodiment or the optical encoder 11 according to the first modified embodiment, and the description in detail of such members is omitted.

In the second modified embodiment, a photodetector 26 and a second light transmitting member 27 described below are used replacing the photodetector 6 and the second light transmitting member 7 in the first embodiment. Moreover, the first light transmitting member 15 and the light shielding member 18 according to the first modified embodiment are used.

The photodetector 26 has four light receiving sections. A third grating $27g$ having a pitch p3, corresponding to the four light receiving sections is formed on a surface toward the photodetector 26, of the second light transmitting member 27. The third grating $27g$ is made of four grating groups dividing the surface toward the photodetector 26 of the second light transmitting member 27 into four equal portions. Each grating group is disposed such that a phase thereof differs only by p3/4 from a phase of the adjacent grating group. A signal detected from each light receiving section of the photodetector 26 is achieved as four pseudo sine-wave signals of which, the phase differs mutually only by ¼ cycle. The structure, the operation, and the effect except for the structure of the photodetector 26 and the second light transmitting member 27 are similar as in the optical encoder 1 according to the first embodiment and in the optical encoder 11 according to the first modified embodiment of the first embodiment.

In the optical encoder 21 according to the second modified embodiment, the third grating $27g$ having the pitch of p3 at a side of detection is formed on the second light transmitting member 27. Therefore, a shape of the light receiving section of the photodetector 26 has a simple structure, and is easy to manufacture. Furthermore, it is possible to deal with design changes such as a change of the pitch and the arrangement of the third grating $27g$ by changes only in the second light transmitting member 27, and the structure has a high versatility of design.

Next, a third modified embodiment of the first embodiment will be described below while referring to FIG. 8.

Figure 8:
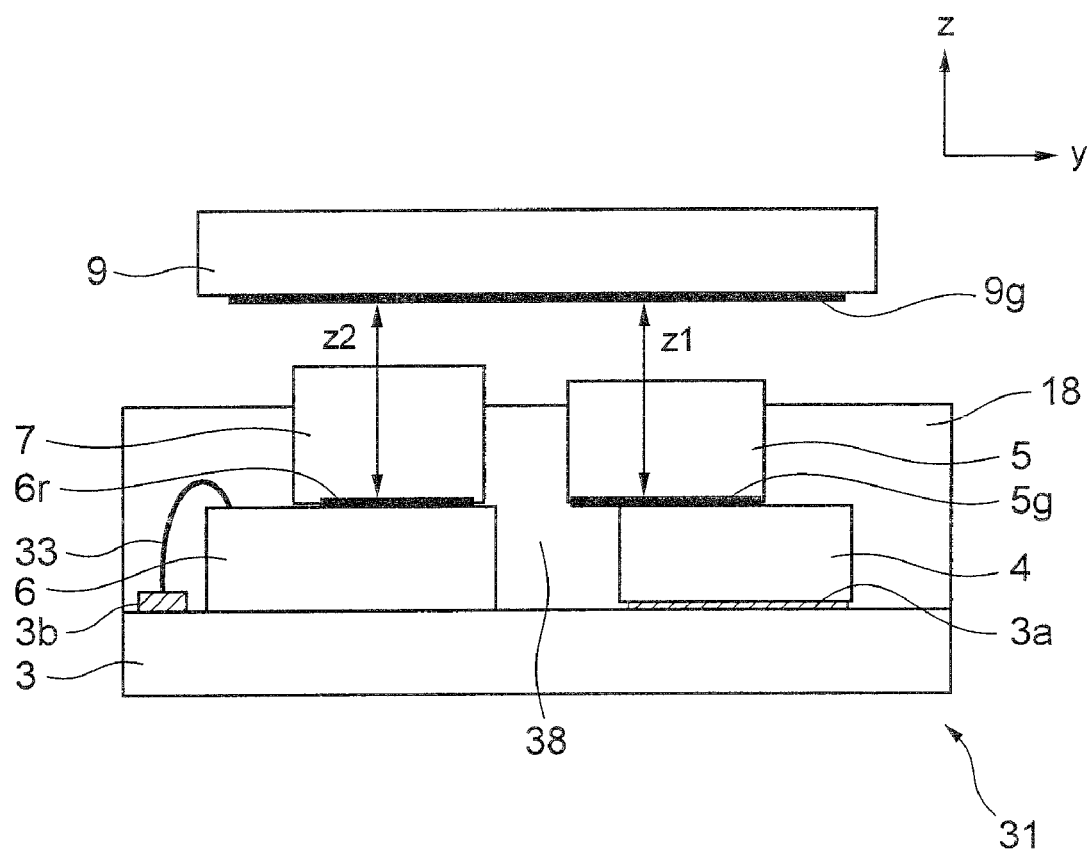
FIG. 8 is a cross-sectional view orthogonal to x direction, showing a structure of an optical encoder according to a third modified embodiment of the first embodiment of the present invention, corresponding to FIG. 2.

FIG. 8 is a cross-sectional view in a direction orthogonal to x direction showing a structure of an optical encoder 31 according to the third modified embodiment of the first embodiment of the present invention, corresponding to FIG. 2. In FIG. 8, same reference numerals are assigned to members that are same as the members in the optical encoder 1 according to the first embodiment, the optical encoder 11 according to the first modified embodiment, and the optical encoder 21 according to the second modified embodiment, and the description in detail of such members is omitted.

In the third modified embodiment, the light shielding member 18 is used replacing the resin material 8 in the first embodiment, and a porting 38 as a stray-light reduction element is provided only in a space between the first light transmitting member 5 and the light source 4, and a space between the second light transmitting member 7 and the photodetector 6.

A scale side of the light shielding member 18 and an area not in contact with the light shielding member 18 on the side surface of the first light transmitting member 5 and the second light transmitting member 7 has no relation with (is irrelevant to) optical transparency, and may be filled with resin. The structure, the operation, and the effect except for the portion at which the light shielding member 18 is disposed are similar as in the first embodiment.

In the third modified embodiment, it is possible to reduce the amount of the light shielding member 18 consumed for the sensor head by restricting the portion at which the light shielding member 18 is disposed by the porting 38. Therefore, out of the side surfaces of the first light transmitting member 15 and the second light transmitting member 7, a portion in which the light shielding member 18 has not been used, may be kept as it is or may be sealed by some other member, thereby improving a degree of freedom of designing.

In the third modified embodiment shown in FIG. 8, the light shielding member 18 having a material such as a resin as a constituent is disposed for filling a space of the first light transmitting member 5 and the second light transmitting member 7. However, replacing this, for example, a stray-light reducing member (stray-light reduction element) in the form of a screen having a function of reducing stray-light may be disposed at an intermediate portion between the first light transmitting member 15 and the second light transmitting member 7.

Moreover, the stray light reducing member may be an opaque member, or may be a member of which, a surface toward the light source 4 is a light absorbing body, or may be a reflecting surface, or may have a function of deflecting the light transmitted, in a direction other than a direction toward the light receiving area 6r of the photodetector 6.

A shape of a side surface of the stray-light reducing member may be any shape provided that it does not allow light to be incident directly on the light receiving area 6r of the photodetector 6. Moreover, when reflected light outgoes from the side surface of the stray-light reducing member, according to the shape of the side surface, the reflected light may be made to be diverged or an arrangement may be made such that the reflected light does not advanced in a predetermined direction such as toward the light source 4.

Concretely, when the abovementioned condition is satisfied, the shape of the side surface may be a plane surface shape, a circular cylindrical surface shape, a spherical shape, and a wave like shape when seen from an upper side of z axis.

Here, the operation and the effect of the stray-light reducing member will be described below.

Light outgoing from the light source 4 is incident directly or via the first light transmitting member 5 on the side surface of the stray-light reducing member toward the light source 4, which is disposed at an intermediate portion of the first light transmitting member 5 and the second light transmitting member 7. The light which is incident does not reach the light receiving area 6r of the photodetector 6 due to an arrangement and optical characteristics including the shape of the side surface of the stray-light reducing member, toward the light source. As a result, it is possible to achieve a high SN ratio for a signal detected in the photodetector 6.

The structure, the action, and the effect except for the abovementioned changes are similar to those in the first embodiment, and the first modified embodiment and the second modified embodiment.

Figure 9:
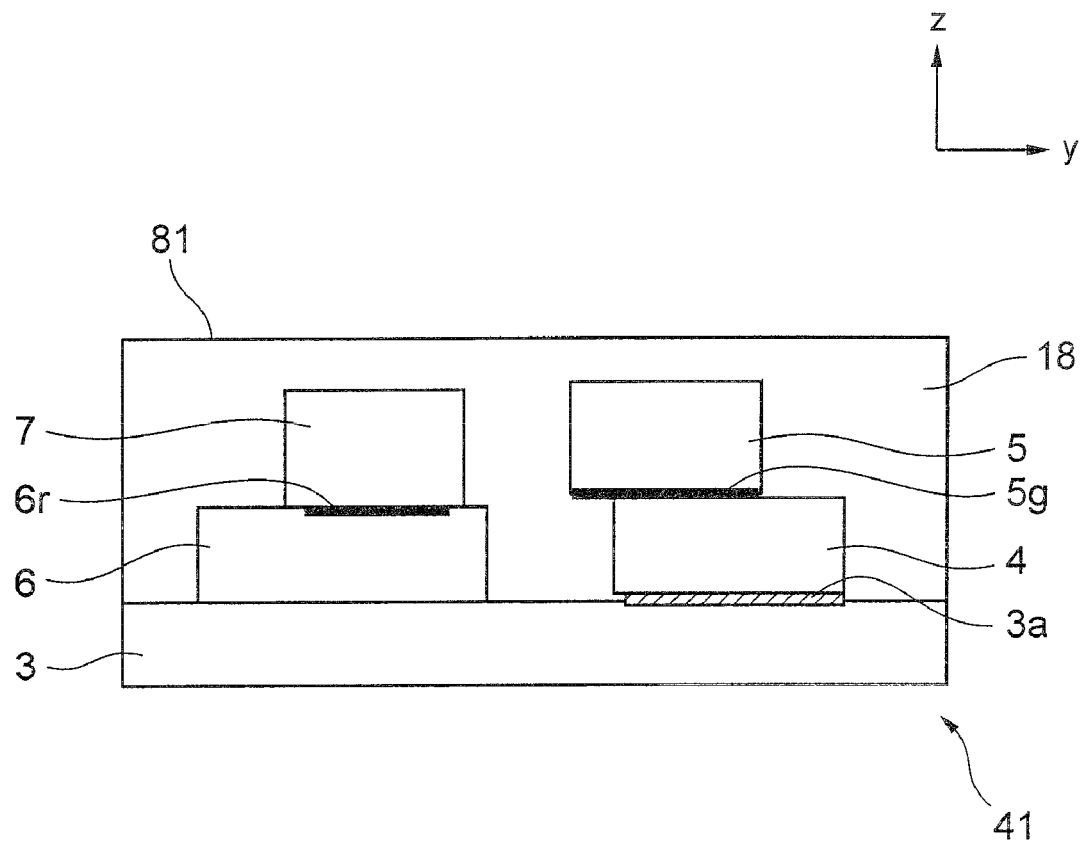
FIG. 9 is a cross-sectional view orthogonal to x direction showing a structure of an optical encoder according to a fourth modified embodiment of the first embodiment of the present invention, showing a state before a light shielding member is processed.
Figure 10:
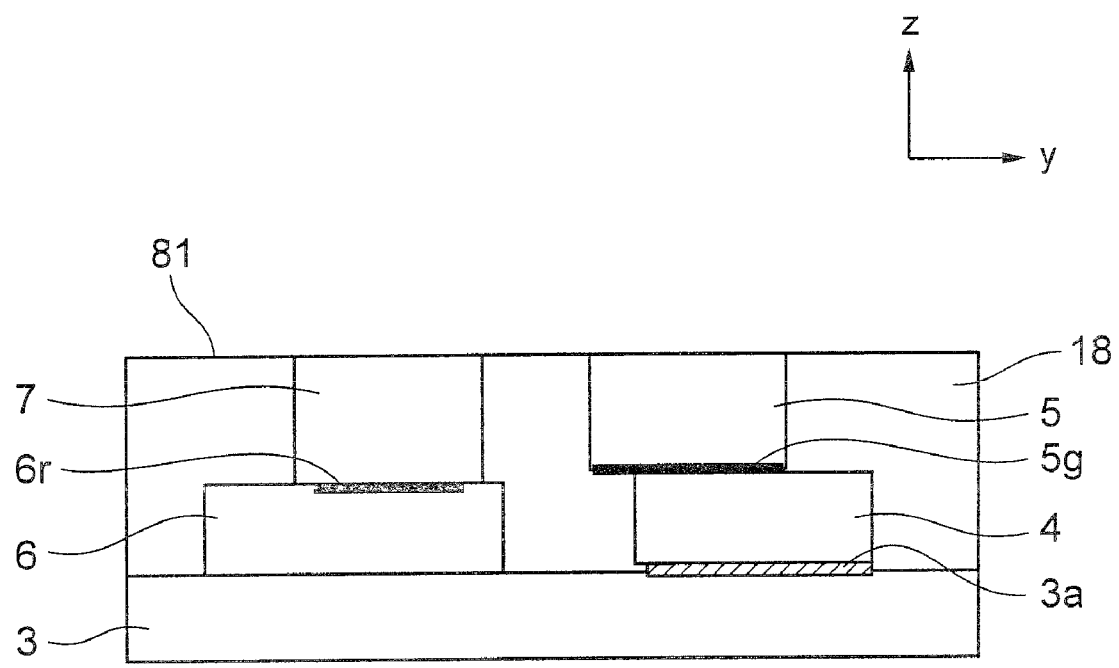
FIG. 10 is a cross-sectional view orthogonal to x direction showing the structure of the optical encoder according to the fourth modified embodiment of the first embodiment of the present invention, showing a state after the light shielding member is processed.

Next, a fourth modified embodiment of the first embodiment will be described below while referring to FIG. 9 and FIG. 10. FIG. 9 and FIG. 10 are cross-sectional views in a direction orthogonal to x direction showing a structure of an optical encoder 41 according to the fourth modified embodiment of the first embodiment of the present invention, corresponding to FIG. 2. FIG. 9 shows a state before the light shielding member 18 as the stray-light reduction element is processed, and FIG. 10 shows a state after the light shielding member 18 is processed. In FIG. 9 and FIG. 10, same reference numerals are assigned to members that are same as members in the optical encoder 1 according to the first embodiment, and the optical encoders 11, 21, and 31 according to the first modified embodiment, the second modified embodiment, and the third modified embodiment, and the description in detail of such members is omitted.

An order of mounting of the optical encoder 41 according to the fourth modified embodiment is as follows. The light source 4, the photodetector 6, the first light transmitting member 5 on the light source 4, the second light transmitting member 7 on the photodetector 6, and wires etc. are mounted on the circuit board 3. Thereafter, the members on the circuit board 3 are embedded in the light shielding member 18. A process such as molding is used for embedding. Thereafter, an upper surface of the light shielding member 18 is polished and the upper surface of the first light transmitting member 5 and the upper surface of the second light transmitting member 7 are matched.

A height of the upper surface of the first light transmitting member 5 and a height of the upper surface of the second light transmitting member 7 may be matched before embedding, or may be matched by grinding at the time of grinding. Moreover, at the time of polishing, only the light shielding member 18 may be polished, and the surface of the first light transmitting member 5 and the second light transmitting member 7 may not be processed. The structure, the operation, and the effect except for a method of manufacturing are similar as those in the first embodiment and the modified embodiments from the first modified embodiment to the third modified embodiment.

By adopting such method of processing, there is no need to take care that at the time of embedding by the light shielding member 18, the light shielding member 18 is not coming over an upper portion of the first light transmitting member 5 and the second light transmitting member 7, and the mounting becomes easy.

Moreover, it becomes possible to match the height of the upper surfaces and to adjust the height, and versatility at the time of manufacturing is improved.

Figure 11:
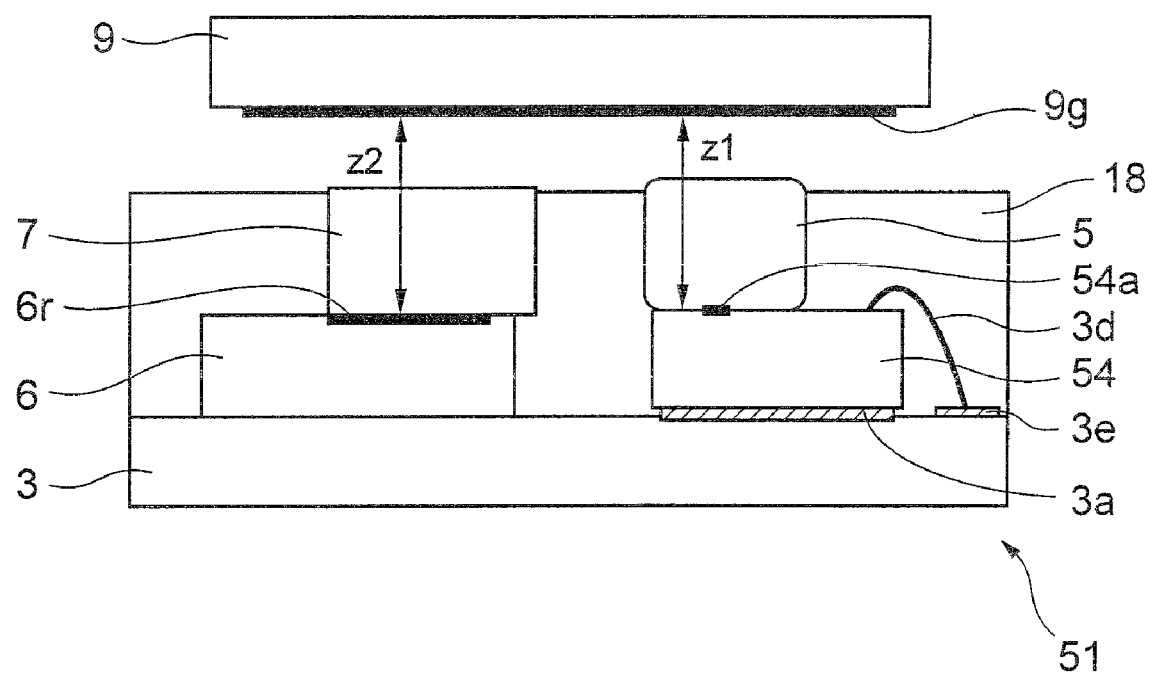
FIG. 11 is a cross-sectional view orthogonal to x direction showing a structure of an optical encoder according to a fifth modified embodiment of the first embodiment of the present invention, corresponding to FIG. 2.

Next, a fifth modified embodiment of the first embodiment will be described below while referring to FIG. 11. FIG. 11 is a cross-sectional view in x direction showing a structure of an optical encoder 51 according to the fifth modified embodiment of the first embodiment of the present invention, corresponding to FIG. 2. In FIG. 11, same reference numerals are assigned to members that are same as the members in the optical encoder 1 according to the first embodiment, and the optical encoders 11, 21, 31, and 41 according to the modified embodiments from the first modified embodiment to the fourth modified embodiment, and the description in detail of such members is omitted.

In the fifth modified embodiment, a bare-chip light source 54 is used replacing the light source 4 in the first embodiment, and the first grating 5g of the first light transmitting member 5 is eliminated.

The optical encoder 51 according to the fifth modified embodiment is an encoder in which, a so-called Talbot interference is used. A light emitting section 54a of the bare-chip light source 54 has a sufficiently small width in a longitudinal direction (x direction) of the scale 9. The bare-chip light source 54 is a point light source or a line light source, and a first grating is not formed on the first light transmitting member 5. Whereas, in a case in which, a width of a light emitting section of the bare-chip light source 54 in the longitudinal direction of the scale 9 is large, when the first grating is formed on the first light transmitting member 5, it is possible to make it function similarly as in the first embodiment.

The first light transmitting member 5 is stuck by an optically transparent adhesive on a light emitting surface of the bare-chip light source 54 with the light emitting section 54a having a desired shape, avoiding an area of an electrode bonding wire 3d. Further, the electrode bonding wire 3d is embedded by the light shielding member 18, and the first light transmitting member 5 and the second light transmitting member 7 are enclosed separately and filled, thus forming a sensor head of the fifth modified embodiment.

Since the second light transmitting member 7 is mounted by sticking upon making to be projected toward the bare-chip light source 54, on the photodetector 6, it is possible to receive effectively light reflected from the scale 9, and to secure a detection signal level. On the other hand, since a side surface of each of the bare-chip light source 54 and the second light transmitting member 7 is covered by the light shielding member 18 as the stray-light reduction element between the bare-chip light source 54 and the second light transmitting member 7, it is possible to absorb light leaked from the bare-chip light source 54 and a light reflected from the surface of the first light transmitting member 5, and to suppress a noise component of the detection signal. Furthermore, the bare-chip light source 54 being a point light source or a line light source, there is not need to adjust a position or a direction of the first grating. Therefore, the mounting is easy, and favorable signal detection is possible.

The structure, the operation, and the effect except for the points mentioned above are similar as those in the first embodiment and the modified embodiments from the first modified embodiment to the fourth modified embodiment.

Figure 12:
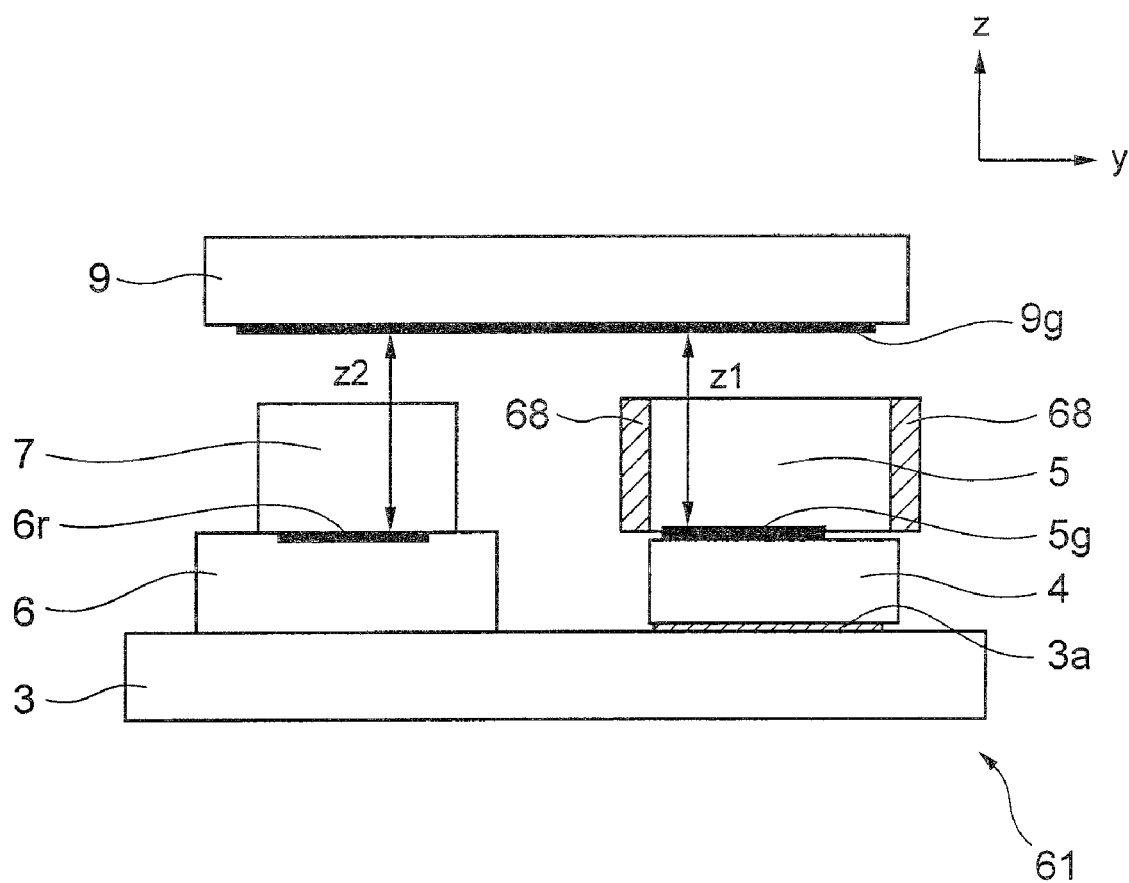
FIG. 12 is a cross-sectional view orthogonal to x direction showing a structure of an optical encoder according to a sixth modified embodiment of the first embodiment of the present invention, corresponding to FIG. 2.

Next, a sixth modified embodiment of the first embodiment will be described below while referring to FIG. 12. FIG. 12 is a cross-sectional view in a direction orthogonal to x direction showing a structure of an optical encoder 61 according to the sixth modified embodiment of the first embodiment of the present invention, corresponding to FIG. 2. In FIG. 12, same reference numerals are assigned to members that are same as the members in the optical encoder 1 according to the first embodiment, and the optical encoders 11, 21, 31, 41, and 51 according to the modified embodiments from the first modified embodiment to the fifth modified embodiment, and the description in detail of such members is omitted.

In the sixth modified embodiment, a light shielding member 68 as the stray-light reduction element is disposed only on the side surface of the first light emitting member 5. A cross-sectional shape in a direction orthogonal to z direction, of the first light transmitting member 5 may be arbitrary, and may be square or round.

An area not in contact with the light shielding member 68 of the light transmitting member in the sixth modified embodiment may be filled by a resin irrespective of optical transparency.

The structure, the operation, and the effect except for the arrangement of the light shielding member 68 are similar as in the first embodiment and the modified embodiments from the first modified embodiment to the fifth modified embodiment.

In the sixth modified embodiment, it is possible to keep minimal the amount of use of the light shielding member 68 by restricting a portion to be disposed of the light shielding member 68. Therefore, a portion around the first light transmitting member 5 and the second light transmitting member 7 in which, the light shielding member 68 is not used may be left as it is, or may be sealed by the other member, thereby improving a degree of freedom of designing. Moreover, the manufacturing is also easy.

For instance, before mounting the first light transmitting member 5 on the sensor head 2, it is possible to keep the light shielding member 68 beside to be in contact with the side surface thereof. Furthermore, it is also possible to keep the light shielding member 68 beside to be contact with the side surface of the light transmitting member in the form of a long rod, and to cut out the first light transmitting member 5. By such process, it is possible to improve mass productivity.

Figure 13A:
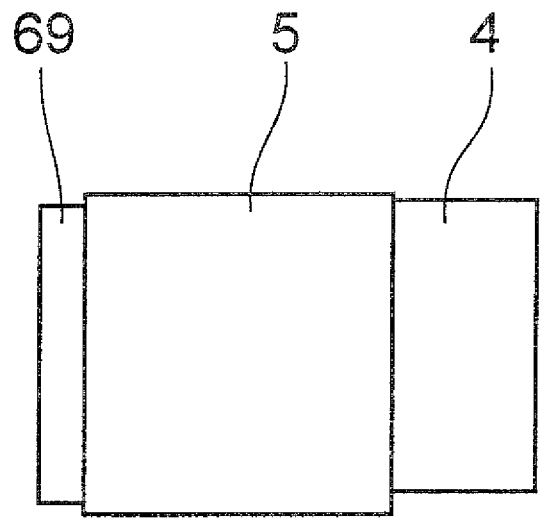
FIG. 13A is a plan view showing a relationship of a light source and a light shielding member.
Figure 13B:
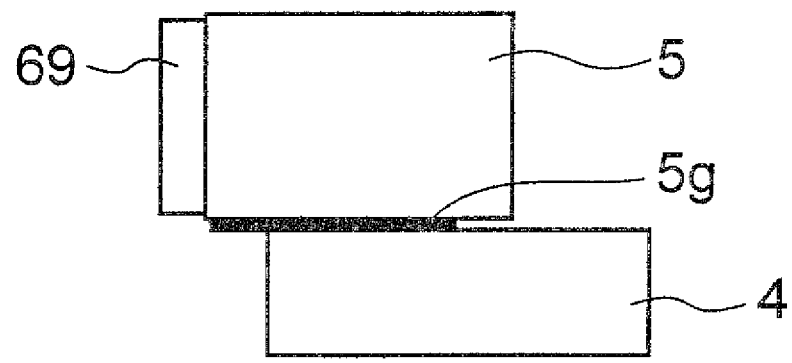
FIG. 13B is a side view of FIG. 13A.

A variation in the sixth modified embodiment, regarding a portion covered by the light transmitting member will be described below while referring to FIG. 13A and FIG. 13B. FIG. 13A is a plan view showing a relationship of the light source 4 and a light shielding member 69, and FIG. 13B is a side view of FIG. 13A. As shown in FIG. 13A and FIG. 13B, the light shielding member 69 covers only a side surface toward the photodetector 6, out of the side surface of the first light transmitting member 5 having a square cross-section in a direction orthogonal to z direction. By shielding a plane between the light source 4 and the photodetector 6 in such manner, a substantial effect is achieved from a point of an improvement in the SN ratio on one hand, and since the light shielding member 69 is formed only on one side surface of the first light transmitting member, the manufacturing becomes easy on the other hand.

Figure 14:
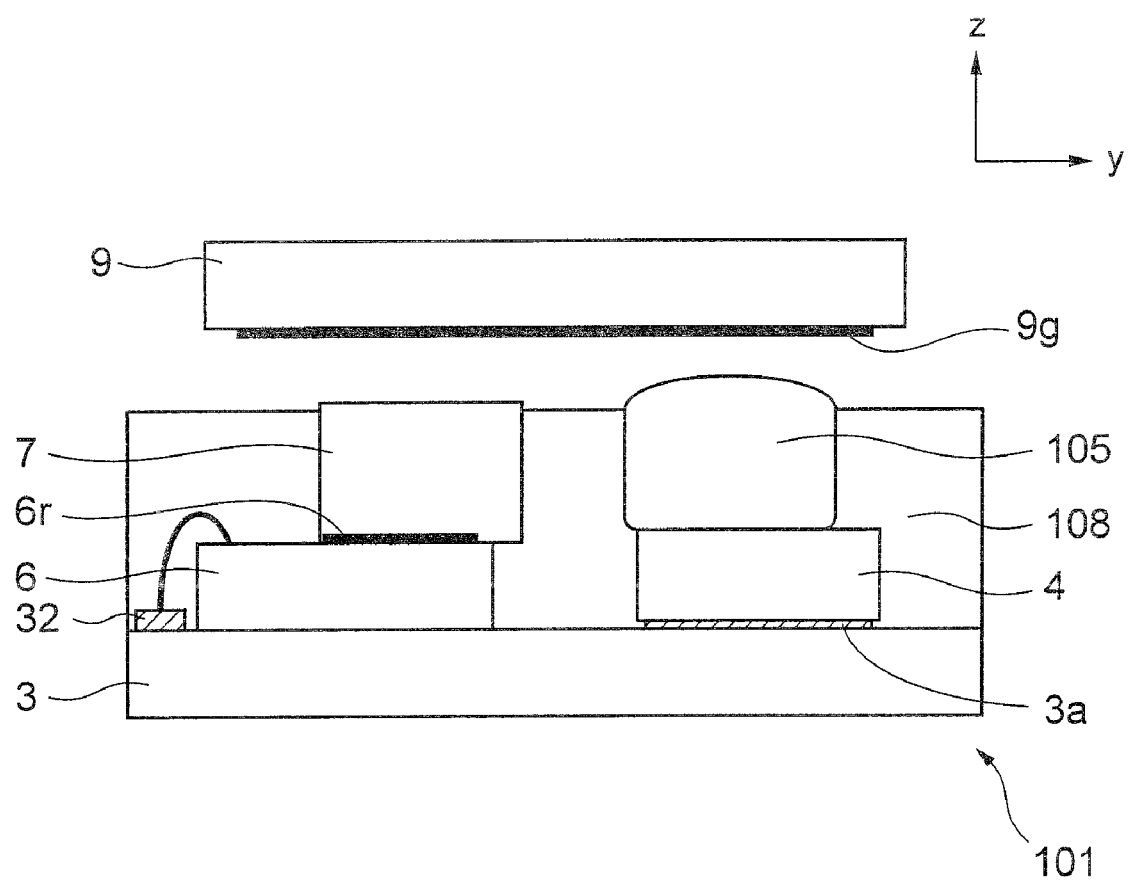
FIG. 14 is a cross-sectional view orthogonal to x direction, showing a structure of an optical encoder according to a second embodiment of the present invention, corresponding to FIG. 2.
Figure 15:
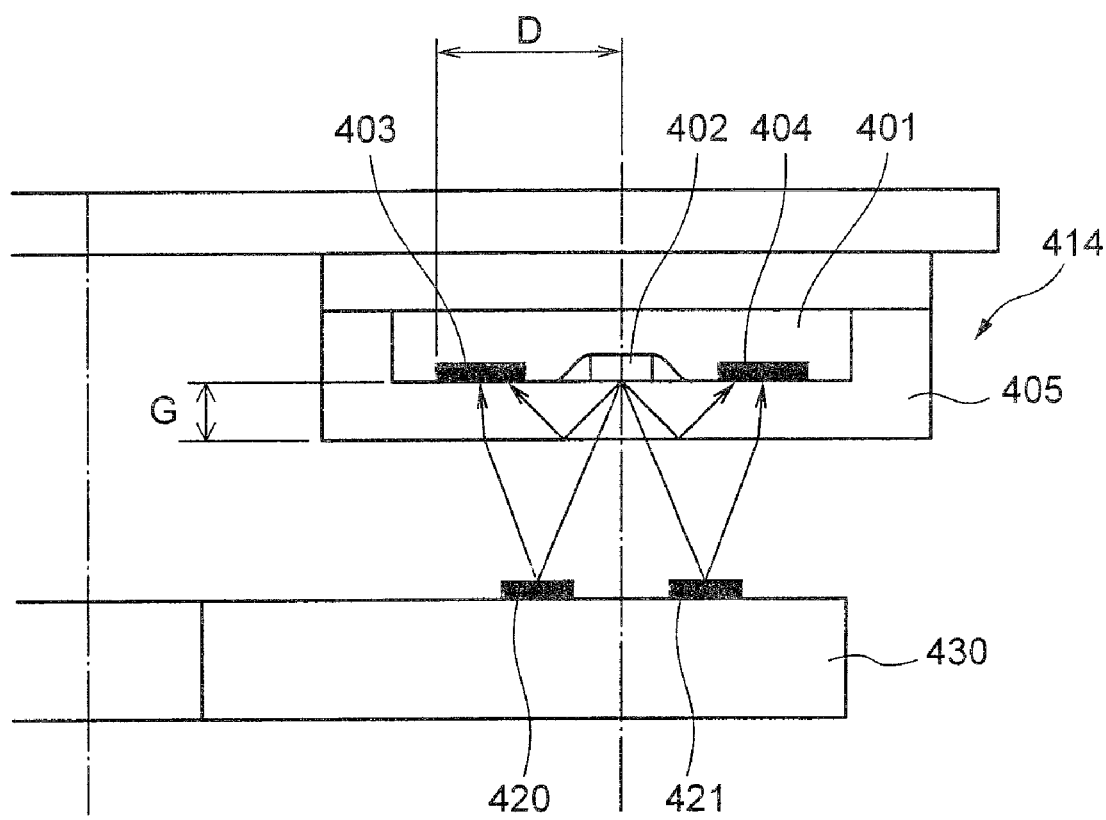
FIG. 15 is a conceptual diagram showing a structure of a conventional encoder.
Figure 16:
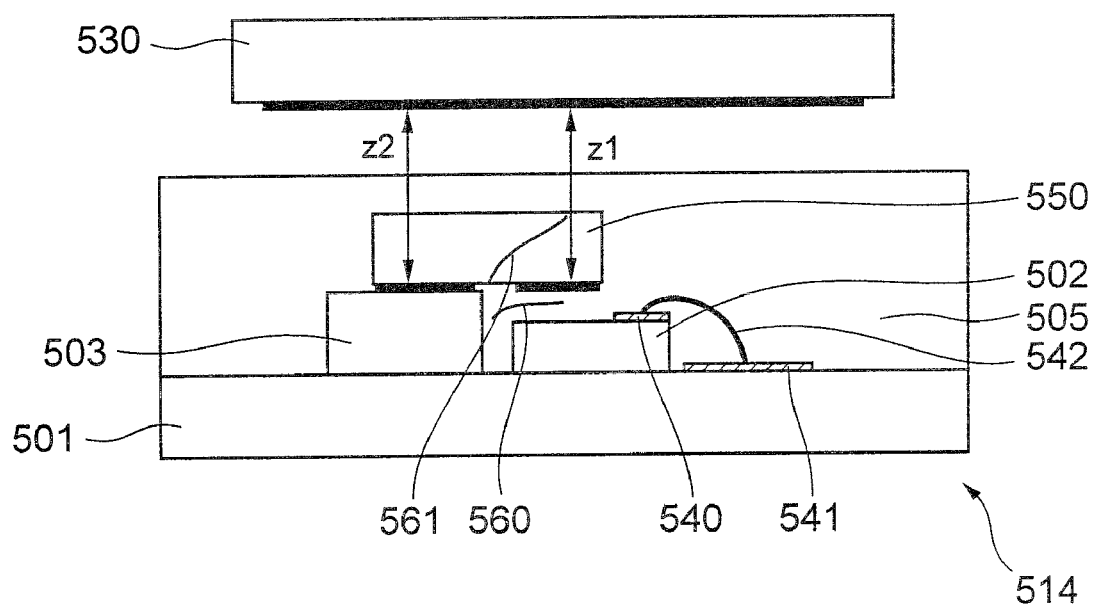
FIG. 16 is a cross-sectional view orthogonal to the direction of movement of a scale, showing the structure of the conventional encoder.

Next, a second embodiment of the present invention will be described below while referring to FIG. 14. FIG. 14 is a cross-sectional view in a direction orthogonal to x direction, showing a structure of an optical encoder 101 according to the second embodiment of the present invention, corresponding to FIG. 2. The optical encoder 101, similarly as the optical encoder 1 according to the first embodiment, includes a sensor head 2 and a scale 9 which is disposed facing the sensor head 2. The light source 4 on the circuit board 3 and the photodetector 6 having the light receiving area 6r formed of a light receiving element array are disposed in the sensor head 2 as separate components.

The light source 4 is a mold LED of a surface-mounting chip type, and an upper surface thereof is flat.

A first light transmitting member 105 is stuck by an optically transparent adhesive on a surface facing the light outgoing surface of the light source 4. In the light transmitting member 105, a surface toward the scale 9 has a shape of a convex lens, and the convex-lens shape is designed and created such that the outgoing light becomes parallel light. A light shielding pattern may be formed on a surface toward the light source 4 of the first light transmitting member 5, in a portion other than an area necessary for the signal detection. The surface toward the scale 9 has the shape of a convex lens, and designing is carried out such that, there exists at least one optical path in which, light outgoing from the light source 4 is incident on the photodetector 6 via the scale 9.

On the other hand, the light receiving element array of the photodetector 6 is formed at the pitch p3, and the light transmitting member is stuck by an optically transparent adhesive on a surface facing the light receiving surface of the photodetector 6. A light shielding pattern is formed on the surface of the second light transmitting member 7, facing the light receiving surface of the light receiving element array, excluding a portion of a light receiving section.

The first light transmitting member 105 is a lens made of glass or plastic, and for the second light transmitting member 7, a member cut out upon processing from a parallel flat plate of glass is used. An upper surface and a lower surface thereof are flat polished surfaces.

The upper surface and the bottom surface of the first light transmitting member 105 and the second light transmitting member 7, excluding a portion which is in contact with the light source 4 or the photodetector 6, are enclosed by a light shielding member 108 as the stray-light reduction element. For thermal characteristics of materials of the first light transmitting member 105, the second light transmitting member 7, the light shielding member 108, and the optically transparent adhesive, members having characteristics same as of a Si-based semiconductor material which forms the photodetector is used.

Moreover, the scale 9 has the second grating 9g which is an optical pattern displacing relatively with respect to the sensor head 2. The second grating 9g is an optical pattern formed at a predetermined pitch p2 in a direction in which the scale 9 and the sensor head 2 move relatively.

The photodetector 6 being similar to the photodetector 6 according to the first embodiment, the description thereof is omitted.

In the second embodiment, the pitch p2 of the second grating 9g of the scale 9 and the pitch p3 of the light receiving element array of the photodetector 6 are made to be the same, and an optical arrangement in which the sensor head 2 and the scale 9 are combined has a structure such that expression (4) and expression (5) in the first embodiment are satisfied.

Next, the operation of the optical encoder 101 according to the second embodiment will be described below.

Light outgoing from the light source 4 is formed as a parallel beam from the first light transmitting member 105, and upon being reflected by the second grating 9g on the scale 9, a light and dark image of a pattern of the second grating 9g is formed on the light receiving area 6r. This image pattern moves according to a relative movement of the sensor head 2 and the scale 9, and this movement is detected by the photodetector 6.

A light and dark diffraction pattern having a same size as the scale pitch is formed on the light receiving area 6r. When the scale 9 moves relatively with respect to the sensor head 2, a signal output from the four electrode pads A1, B1, A2, and B2 (FIG. 3) is achieved as four pseudo sine-wave signals of which, the phase differs mutually only by ¼ cycle.

Here, for eliminating noise in the detection signal after the current-voltage conversion, the sensor head 2, as shown in FIG. 5, takes a differential of a signal of a mutually reverse phase, and achieves the pseudo sine-wave signals as an A-phase and a B-phase respectively. This pseudo sine-wave signal is binarized inside or outside the sensor head 2, and the displacement is detected. Or, the signal is processed by an interpolation processing circuit, and it is possible to detect the amount of displacement with higher resolution.

As shown in FIG. 14, by enclosing the first light transmitting member 105 and the second light transmitting member 7 separately by the light shielding member 108, it is possible to shield light reflected of (by) the first light transmitting member 105. Furthermore, it is also possible to shield light leaked from the light source 4, and via a side area of the first transmitting member 105.

The optical encoder 101 according to the second embodiment showed the following effect.

On the whole, regarding the stray-light reduction, the optical encoder 101 according to the second embodiment has an effect similar to the effect of the optical encoder 1 of the first embodiment. Moreover, since the light emitting section of the first light transmitting member 105 has the shape of a convex lens, the arrangement makes difficult an occurrence of internally reflected light at the upper surface. Therefore, it is possible to reduce the DC component occupying the detection signal. Furthermore, since the light emitting section of the first light transmitting member is designed to have the shape of a convex lens in order to emit a parallel beam, the outgoing light is not diffused, and it is possible to improve the level of the detection signals. The two points mentioned above facilitate the improvement in the SN ratio. Moreover, since the outgoing light is a parallel beam, the detection signal level is stable even when the gap between the sensor head 2 and the scale 9 fluctuates.

As it has been described above, the optical encoder according to the present invention is useful for detecting information of movement of mobile objects such as a lens.

The optical encoder according to the present invention, by including a stray-light reduction element which reduces stray light that does not contribute to signal detection, shows an effect that it is possible to realize an encoder which is not affected easily by stray light inside the head, and which is suitable for size reduction and thinning.

What is claimed is:

1. An optical encoder comprising:
a scale which is installed on one member of which, displacement is detected; and
a detecting head which is installed on the other member which moves relatively with respect to the first member, and is disposed facing the scale, wherein
a predetermined optical pattern in the direction of relative movement is provided on the scale, and
the detecting head includes
a light emitting section which irradiates a predetermined light on the scale,
a light detecting section which includes a light receiving surface which receives, via the optical pattern, light irradiated on the scale from the light emitting section and which detects distribution of light formed on the light receiving surface,
a first light transmitting member which is disposed in an optical path between the light emitting section and the scale, and
a second light transmitting member which is disposed separately from the first light transmitting member in an optical path between the scale and the light detecting section,
and further comprising:
a stray-light reduction element which is interposed between the surface of the first light transmitting member and the surface of the second light transmitting member, and which reduces stray light which does not contribute to signal detection.

2. The optical encoder according to claim 1, wherein at least one of the surfaces of the first light transmitting member and the second light transmitting member is the stray-light reduction element, and reduces the stray light by an optical function of an interface, as the stray-light reduction element.

3. The optical encoder according to claim 1, wherein
at least one of the surfaces of the first light transmitting member and the second light transmitting member, and one of a member and a space between the first light transmitting member and the second light transmitting member are the stray-light reduction elements, and
the stray light is reduced by an optical function of the surface as the stray-light reduction element, and by the structure and arrangement of one of the member and the space as the stray-light reduction element.

4. The optical encoder according to claim 1, wherein the stray-light reduction element is disposed or formed only at a position where the element does not contribute at all to detecting displacement.

5. The optical encoder according to claim 1, wherein
each surface of the first light transmitting member and the second light transmitting member includes at least one surface including a portion through which light passes, which is involved in signal detection, and at least one surface which is not involved in signal detection, and
the stray-light reduction element is disposed or arranged on at least one of the surfaces not involved in signal detection, of the first light transmitting member and the second light transmitting member.

6. The optical encoder according to claim 1, wherein excluding the first light transmitting member and the second light transmitting member, in the detecting head, at least the light emitting section, the light detecting section, and wiring members do not protrude from the stray-light reduction element.

7. The optical encoder according to claim 2, wherein
the stray-light reduction element is a member disposed between the first light transmitting member and the second light transmitting member, and
reduces stray light by an optical function of the member as the stray-light reduction element.

8. The optical encoder according to claim 4, wherein
a member is disposed between the first light transmitting member and the second light transmitting member, and the member is the stray-light reduction element, and
reduces stray light by a combination of an optical function and an arrangement of the member as the stray-light reduction element.

9. The optical encoder according to claim 1, wherein a shape of the first light transmitting member and a shape of the second light transmitting member are determined in advance before mounting.

10. The optical encoder according to claim 1, wherein the first light transmitting member and the second light transmitting member are made of a material which does not undergo plastic deformation at the time of mounting.

11. The optical encoder according to claim 1, wherein the first light transmitting member and the second light transmitting member are made of a material which does not melt at the time of mounting.

12. The optical encoder according to claim 1, wherein the position of the first light transmitting member and the position of the second light transmitting member are adjustable at the time of mounting.

13. The optical encoder according to claim 1, wherein handling of the first light transmitting member and the second light transmitting member is possible at the time of mounting.

14. The optical encoder according to claim 1, wherein the first light transmitting member is stacked on a surface facing the scale of the light emitting section, and the second light transmitting member is stacked on a surface facing the scale of the light detecting section.

* * * * *